United States Patent
Suzuki et al.

(10) Patent No.: US 9,757,655 B2
(45) Date of Patent: Sep. 12, 2017

(54) GAME CONTROL DEVICE, GAME CONTROL METHOD, STORAGE MEDIUM, AND GAME SYSTEM

(71) Applicant: KONAMI DIGITAL ENTERTAINMENT CO., LTD., Tokyo (JP)

(72) Inventors: Masayoshi Suzuki, Yao (JP); Hiroyuki Tomita, Saitama (JP); Minako Yoshida, Tokyo (JP)

(73) Assignee: KONAMI DIGITAL ENTERTAINMENT CO., LTD., Tokyo (JP)

( * ) Notice: Subject to any disclaimer, the term of this patent is extended or adjusted under 35 U.S.C. 154(b) by 387 days.

(21) Appl. No.: 14/396,576

(22) PCT Filed: Apr. 3, 2013

(86) PCT No.: PCT/JP2013/002299
§ 371 (c)(1),
(2) Date: Oct. 23, 2014

(87) PCT Pub. No.: WO2013/161190
PCT Pub. Date: Oct. 31, 2013

(65) Prior Publication Data
US 2015/0141141 A1    May 21, 2015

(30) Foreign Application Priority Data
Apr. 26, 2012 (JP) .................................. 2012-100644

(51) Int. Cl.
*A63F 13/00* (2014.01)
*A63F 9/24* (2006.01)
(Continued)

(52) U.S. Cl.
CPC .............. *A63F 13/69* (2014.09); *A63F 13/58* (2014.09); *A63F 13/79* (2014.09); *A63F 13/80* (2014.09);
(Continued)

(58) Field of Classification Search
CPC ........ A63F 13/69; A63F 13/79; A63F 13/825; A63F 13/58; A63F 13/798; A63F 13/80; A63F 13/812; A63F 13/828
See application file for complete search history.

(56) References Cited

U.S. PATENT DOCUMENTS

2003/0190940 A1* 10/2003 Gordon ................. A63F 13/005
463/9
2003/0207704 A1* 11/2003 Takahashi ............... A63F 13/10
463/1
(Continued)

FOREIGN PATENT DOCUMENTS

JP    2004-73681    3/2004
JP    4855549       1/2012
(Continued)

OTHER PUBLICATIONS

Million Arthur Menu Descriptions, http://blog.naver.com/jjevol/100155635814, Apr. 11, 2012, with English translation.
(Continued)

*Primary Examiner* — Milap Shah
(74) *Attorney, Agent, or Firm* — Wenderoth, Lind & Ponack, L.L.P.

(57) ABSTRACT

According to the game control device, game control method, game control program, storage medium and game system of this invention, when composite processing on characters is performed, consumption points that are consumed in the composite processing are subtracted from the composition points corresponding to the user's user identifying informa-
(Continued)

tion, and when the subtraction result is negative, predetermined point addition processing is performed until the subtraction result becomes zero or more. By performing the point addition processing as described above, the game control device, game control method, game control program, storage medium and game system can improve the user's operability without requiring the reselection of other characters to be composited.

12 Claims, 15 Drawing Sheets

(51) Int. Cl.
  *A63F 13/69* (2014.01)
  *A63F 13/80* (2014.01)
  *A63F 13/58* (2014.01)
  *A63F 13/79* (2014.01)
  *A63F 13/812* (2014.01)
  *A63F 13/798* (2014.01)
  *A63F 13/828* (2014.01)

(52) U.S. Cl.
  CPC ........... *A63F 13/798* (2014.09); *A63F 13/812* (2014.09); *A63F 13/828* (2014.09); *A63F 2300/8011* (2013.01)

(56) References Cited

U.S. PATENT DOCUMENTS

| | | | |
|---|---|---|---|
| 2009/0042629 A1* | 2/2009 | Yamashita | A63F 13/10 463/9 |
| 2009/0104992 A1* | 4/2009 | Kouno | A63F 13/10 463/36 |
| 2010/0210364 A1* | 8/2010 | York | A63F 13/79 463/43 |
| 2010/0304858 A1* | 12/2010 | Asuke | A63F 13/525 463/31 |
| 2011/0195765 A1 | 8/2011 | Fujimoto | |
| 2013/0260881 A1 | 10/2013 | Nonaka et al. | |
| 2014/0057709 A1* | 2/2014 | Ukai | A61F 13/10 463/29 |
| 2014/0213351 A1 | 7/2014 | Nonaka et al. | |
| 2014/0221062 A1* | 8/2014 | Shinoda | A63F 13/12 463/6 |
| 2014/0349765 A1* | 11/2014 | Namgoong | G06F 17/30371 463/42 |

FOREIGN PATENT DOCUMENTS

JP  5086487  11/2012
KR  10-2011-0055720  5/2011

OTHER PUBLICATIONS

International Search Report mailed Jul. 9, 2013 in International (PCT) Application No. PCT/JP2013/002299.
"Apuri Fan", vol. 2, Apr. 15, 2012, pp. 18-19 along with partial English translation.
"Tower Dream 2 Perfect Guide", 1st Edition, Kabushiki Kaisha Akuseera, Dec. 24, 1998, pp. 12, 15, 24 along with partial English translation.

* cited by examiner

FIG.6A ~311

| USER ID | USER NAME | DISPLAY IMAGE | TEAM | SKILL LEVEL | ACTION POINTS | MANAGEMENT POINTS | ENHANCEMENT POINTS | CHEERING POINTS | NUMBER OF BASEBALL PLAYERS | FELLOW GAME PLAYERS |
|---|---|---|---|---|---|---|---|---|---|---|
| 000001 | KNM | 01001.jpg | P1 | 85 | 35 | 60 | 3500 | 15000 | 40 | 012345, ··· |
| 000002 | KDE | 00251.jpg | P2 | 65 | 40 | 60 | 1200 | 10000 | 35 | 054321, ··· |
| | | | | | | | | | | |
| | | | | | | | | | | |
| | | | | | | | | | | |
| | | | | | | | | | | |
| | | | | | | | | | | |
| | | | | | | | | | | |

FIG.6B  USER ID: 00001  ~312

| BATTING ORDER/ PITCHER ROTATION | SERIAL KEY | POSITION | ABILITY | | | CARD NO. |
|---|---|---|---|---|---|---|
| | | | BATTING POWER | RUNNING ABILITY | FIELDING SKILL | |
| 9 | 1 | SECOND BASE | 310 | 450 | 810 | 10025 |
| 3 | 3 | SHORTSTOP | 320 | 460 | 820 | 10028 |
| | | | | | | |
| | | | | | | |
| | | | | | | |

FIG.7A

| SERIAL KEY | CARD NO. | ISSUE TIME | ACQUISITION TIME | LAST UPDATE TIME | INITIALLY HELD USER ID | CURRENTLY HELD USER ID | RARITY | ABILITY | | | |
|---|---|---|---|---|---|---|---|---|---|---|---|
| | | | | | | | | TOTAL ABILITY LEVEL | BATTING POWER | RUNNING ABILITY | FIELDING SKILL |
| 1 | 1001025 | ... | ... | ... | 000001 | 001010 | 3 | 492 | 330 | 400 | 700 |
| 2 | 1001028 | ... | ... | ... | 000001 | 000001 | 5 | 490 | 320 | 450 | 680 |
| 3 | 1001025 | ... | ... | ... | 000002 | 002345 | 4 | 540 | 350 | 500 | 750 |
| 4 | 1001026 | ... | ... | ... | 000001 | 102456 | 4 | 546 | 380 | 350 | 810 |

| CARD NO. | NAME | BASIC ABILITY | | | ... | IMAGE DATA NAME |
|---|---|---|---|---|---|---|
| | | BATTING POWER | RUNNING ABILITY | FIELDING SKILL | | |
| 10001 | KOJIRO | 280 | 350 | 300 | ... | 10001.jpg |
| 10002 | KOTARO | 290 | 340 | 310 | ... | 10002.jpg |
| 10003 | SABURO | 270 | 370 | 330 | ... | 10003.jpg |

| ENHANCEMENT | | | | |
|---|---|---|---|---|
| PLEASE SELECT BASEBALL PLAYER TO BE ENHANCED | | | | |
| ☑ | | BASEBALL PLAYER A | | AR-11 |
| | | BATTING POWER 122 | RUNNING ABILITY 280 | FIELDING SKILL 206 |
| ☐ | | BASEBALL PLAYER H | | AR-12 |
| | | BATTING POWER 85 | RUNNING ABILITY 305 | FIELDING SKILL 186 |
| ☐ | | BASEBALL PLAYER K | | AR-13 |
| | | BATTING POWER 107 | RUNNING ABILITY 308 | FIELDING SKILL 186 |

FIG.13

PLEASE SELECT BASEBALL PLAYERS TO BE INTEGRATED
(YOU WILL LOSE CARD OF SELECTED PLAYERS)

☑ BASEBALL PLAYER M
BATTING POWER　RUNNING ABILITY　FIELDING SKILL
65　　　　　　180　　　　　　130　　　～AR-21

☑ BASEBALL PLAYER B
BATTING POWER　RUNNING ABILITY　FIELDING SKILL
72　　　　　　260　　　　　　170　　　～AR-22

☑ BASEBALL PLAYER J
BATTING POWER　RUNNING ABILITY　FIELDING SKILL
122　　　　　　280　　　　　　206　　　～AR-23

☐ BASEBALL PLAYER S
BATTING POWER　RUNNING ABILITY　FIELDING SKILL
85　　　　　　305　　　　　　186　　　～AR-24

☐ BASEBALL PLAYER T
BATTING POWER　RUNNING ABILITY　FIELDING SKILL
107　　　　　　308　　　　　　186　　　～AR-25

⋮

ENHANCE ～m11

FIG.15

| SALE |
|---|
| FOLLOWING BASEBALL PLAYERS WILL BE SOLD |

BASEBALL PLAYER S

BATTING POWER  RUNNING ABILITY  FIELDING SKILL
85              305              186                — AR-31

BASEBALL PLAYER T

BATTING POWER  RUNNING ABILITY  FIELDING SKILL
107             308              186                — AR-32 m21 PERMITTED    m22 NOT PERMITTED

FIG.16

BASEBALL PLAYER A GREW BY 132%

GAME CONTROL DEVICE, GAME CONTROL METHOD, STORAGE MEDIUM, AND GAME SYSTEM

TECHNICAL FIELD

The present invention relates to a game control technology of controlling the execution of a competition game at the time of playing the competition game using a communication terminal that is communicably connected via a communication network.

BACKGROUND ART

Games have evolved from a mode of being played by loading a storage medium with a game program recorded thereon into a game machine, to online games that are played by exchanging data via a communication network pursuant to the advancement of communication technology, and in recent years a mode referred to as "social games" has emerged.

A social game is generally executed with game application software that is provided from a service known as a Social Networking Service (SNS) which is equipped with a communication function and realized by creating a social network online. This social game is one type of online game that is characterized by being played among an unspecified number of users while communicating with each other. Since this social game is run on a web browser which uses an API (Application Program Interface) or the like, a user can enjoy a social game so as long as he/she has a communication terminal with a web browser and which is connectable to the internet.

There are various types of social games themed on battle, action, RPG, puzzle, sports and so on, and a competition game such as a baseball game is also known as one such type of social game. With a competition game, a wide array of variations is included in addition to the competition itself in order to offer greater amusement. As one example, there is a function which allows the user (game player) to customize the ability of one's character to be operated by the user, and, for example, Patent Literature 1 discloses a function referred to as "enhancement".

This "enhancement" disclosed in Patent Literature 1 is a function of integrating a baseball player B with a baseball player A and customizing the ability values of the baseball player A by adding a fixed rate of the respective ability values of batting power, running ability, and fielding skill in the baseball player B as a game player character that will disappear once integrated, to the respective ability values of batting power, running ability, and fielding skill in the baseball player A as a game player character (corresponds to a character in this case) to be enhanced. In this enhancement, a fixed number of points is required for performing the enhancement in order to maintain the game balance, and the fixed number of points is consumed from the game player's points when enhancement is performed. These points are referred to as enhancement points, and given based on the user's predetermined operation.

Meanwhile, in the foregoing enhancement, there are cases where provided is a function of collectively integrating, with a single operation, a plurality of baseball players as game player characters with the baseball player A as the game player character to be enhanced. In other words, a plurality of game player characters to be integrated are selected by the user, and the enhancement execution button is operated by the user (hereinafter sometimes referred to as "collective enhancement", and the ensuing explanation is based on collective enhancement). Here, the points that are consumed in this collective enhancement will be a quantity according to the number of game player characters to be integrated, but when the user does not have enough enhancement points as the points that are consumed in the collective enhancement of the plurality of game player characters selected by the user, enhancement is not executed, and an announcement to the effect that the user does not have enough enhancement points is displayed on the user's communication terminal. Note that there are cases where the points that are consumed in the collective enhancement are (number of characters to be integrated)×(the fixed number of points), or cases where the points that are consumed in the collective enhancement will differ according to the character's parameters (abilities). Thus, after confirming the announcement to the effect that the user does not have enough enhancement points, the user is required to reduce the number of game player characters to be integrated and reselect the game player characters to be selected. Nevertheless, whether collective enhancement can actually be executed after reducing the number of game player characters to be integrated as described above cannot be confirmed until the enhancement execution button is operated, and there was inconvenience in the operability with respect to the possibility that an announcement to the effect that the user does not have enough enhancement points could be displayed again.

CITATION LIST

Patent Literature

Patent Literature 1: Japanese Patent No. 4855549 (paragraph [0115] to paragraph [0117])

SUMMARY OF INVENTION

The present invention was devised in view of the foregoing circumstances, and an object of this invention is to provide a game control device, a game control method, a storage medium and a game system with improved operability upon collectively integrating, with a single operation, a plurality of baseball player characters.

With the game control device, game control method, storage medium and game system of this invention, when composite processing of characters is performed, consumption points that are consumed in the composite processing are subtracted from the composition points corresponding to the user's user identifying information, and when the subtraction result is negative, predetermined point addition processing is performed until the subtraction result becomes zero or more. By performing the point addition processing as described above, the game control device, game control method, storage medium and game system can improve the user's operability without requiring the reselection of other characters to be composited.

In addition to those described above, the other objects, features and advantages of the present invention will become apparent from the ensuing detailed description and appended drawings.

BRIEF DESCRIPTION OF DRAWINGS

FIGS. 6A and 6B are diagrams showing the configuration of the user database included in the database server.

FIGS. 7A and 7B are diagrams showing the configuration of the card database included in the database server.

FIG. 12 shows an example of a web page for selecting the baseball player to be enhanced that is displayed on the communication terminal by the game advancing unit of the game control device.

FIG. 13 shows an example of a web page for selecting the baseball players to be integrated that are displayed on the communication terminal by the game advancing unit of the game control device.

FIG. 15 shows an example of a web page for inquiring whether or not to permit the sale that is displayed on the communication terminal by the game advancing unit of the game control device.

FIG. 16 shows an example of a web page for displaying the enhancement processing result that is displayed on the communication terminal by the game advancing unit of the game control device.

DESCRIPTION OF EMBODIMENTS

Figure 1:
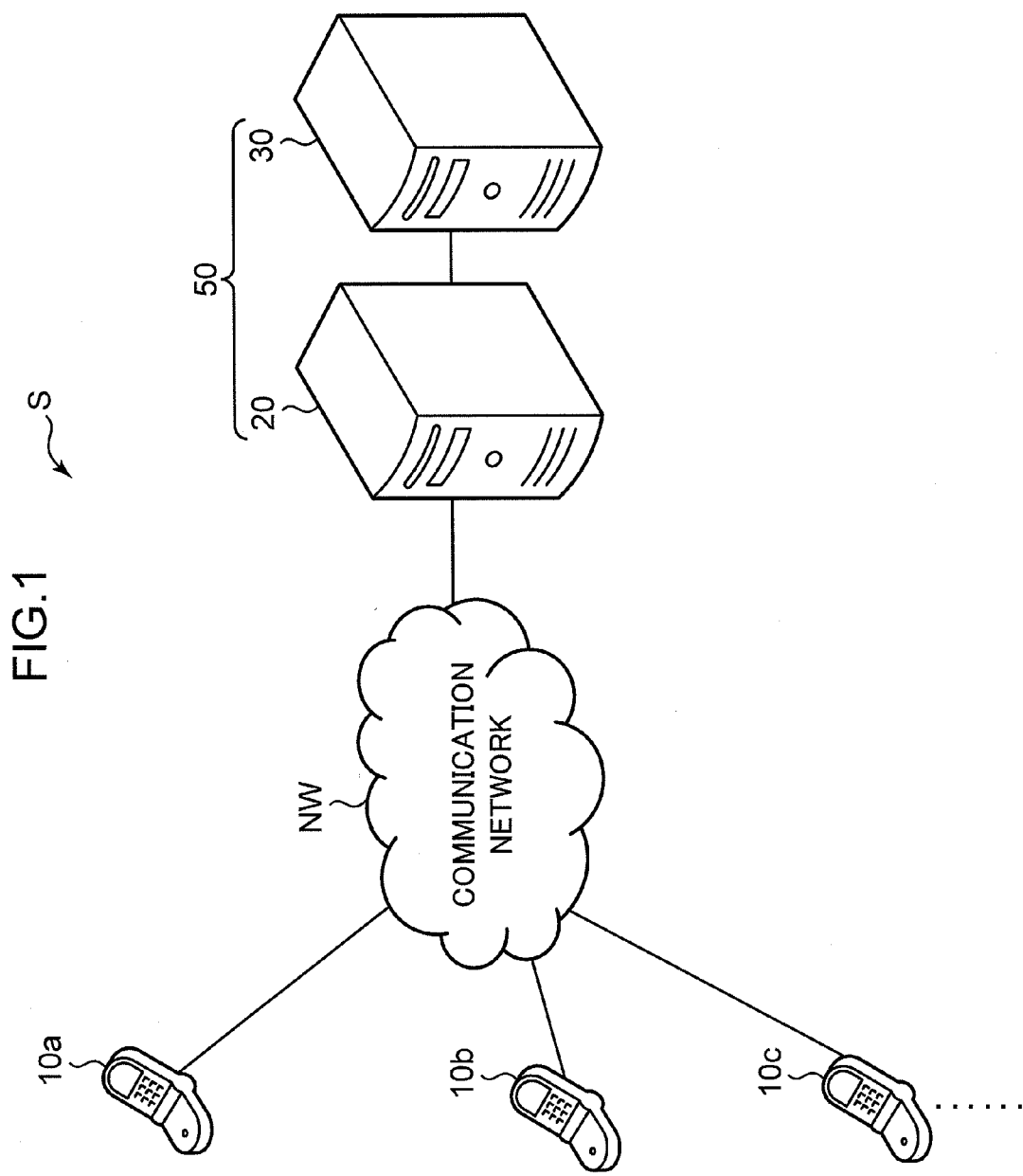
FIG. 1 is a diagram showing the basic configuration of the game system in an embodiment of the present invention.

An embodiment according to the present invention is now explained with reference to the drawings. Note that configurations that are given the same reference numeral in the respective drawings indicate that they are of the same configuration, and the redundant explanation thereof is omitted as appropriate. Moreover, when configurations are collectively referred to in this specification, such configurations are given reference numerals without any suffix, and when configurations are individually referred to in this specification, such configurations are given reference numerals with a suffix.

<Explanation of Configuration of Game System>

FIG. 1 is a diagram showing the basic configuration of the game system in an embodiment of the present invention. In FIG. 1, a game system S of this embodiment comprises communication terminals 10 (10a, 10b, 10c, . . . ) to be operated by the user, a game server 20, and a database server (hereinafter abbreviated as "DB server") 30. The respective communication terminals 10a, 10b, 10c, . . . are each a terminal that is operated by an individual user (game player), has a function of connecting to the internet, and loaded with a web browser capable of displaying web pages. The communication terminal 10 is, for example, a portable terminal such as a so-called smartphone, a PDA (Personal Digital Assistant), or a personal computer. Moreover, the game server 20 is loaded with applicable software that can be run on the web browser as game application software (hereinafter abbreviated as "game application"). The DB server 30 manages various types of information described later which are required for executing the game, and is connected to the game server 20, via a wire for example, in order to read and write the foregoing information. The game server 20 and the DB server 30 are an example of the game control device for controlling the execution of a game by the communication terminal 10 that is operated by the user, and are connected to be accessible from the communication terminal 10 via a communication network NW.

The communication network NW is a communication network that is configured from a wired or wireless transmission line. The communication network NW is a telephone line, a digital communication network, a wireless communication network or the like. Data is transmitted to the communication network NW according to a predetermined communication protocol. Used as the communication protocol is, for example, an internet protocol group such as HTTP (Hyper Text Transfer Protocol), FTP (File Transfer Protocol) or TCP/IP (Transmission Control Protocol/Internet Protocol). The communication network NW configures the so-called internet as a result of using the foregoing internet protocol group.

With this game system, the user launches the web browser of the communication terminal 10 and accesses the game server 20, displays the web page provided by the game server 20 on the communication terminal 10, and executes the game by operating the communication terminal 10 on the web page as the game player of the game.

Note that, while not shown in FIG. 1, the game system S may also be provided with an authentication server for authenticating the user (game player) of the respective communication terminals 10 separately from the game server 20. Moreover, when a plurality of game servers 20 are provided in order to accept access from more communication terminals 10, a load balancer for balancing the load between the plurality of game servers 20 may also be provided. Moreover, while the game control device 50 is configured from the respective server devices; namely, the game server 20 and the DB server 30, the game control device 50 may also be configured as a single server device comprising both of these functions.

<Explanation of Configuration of Communication Terminal>

Figure 2:
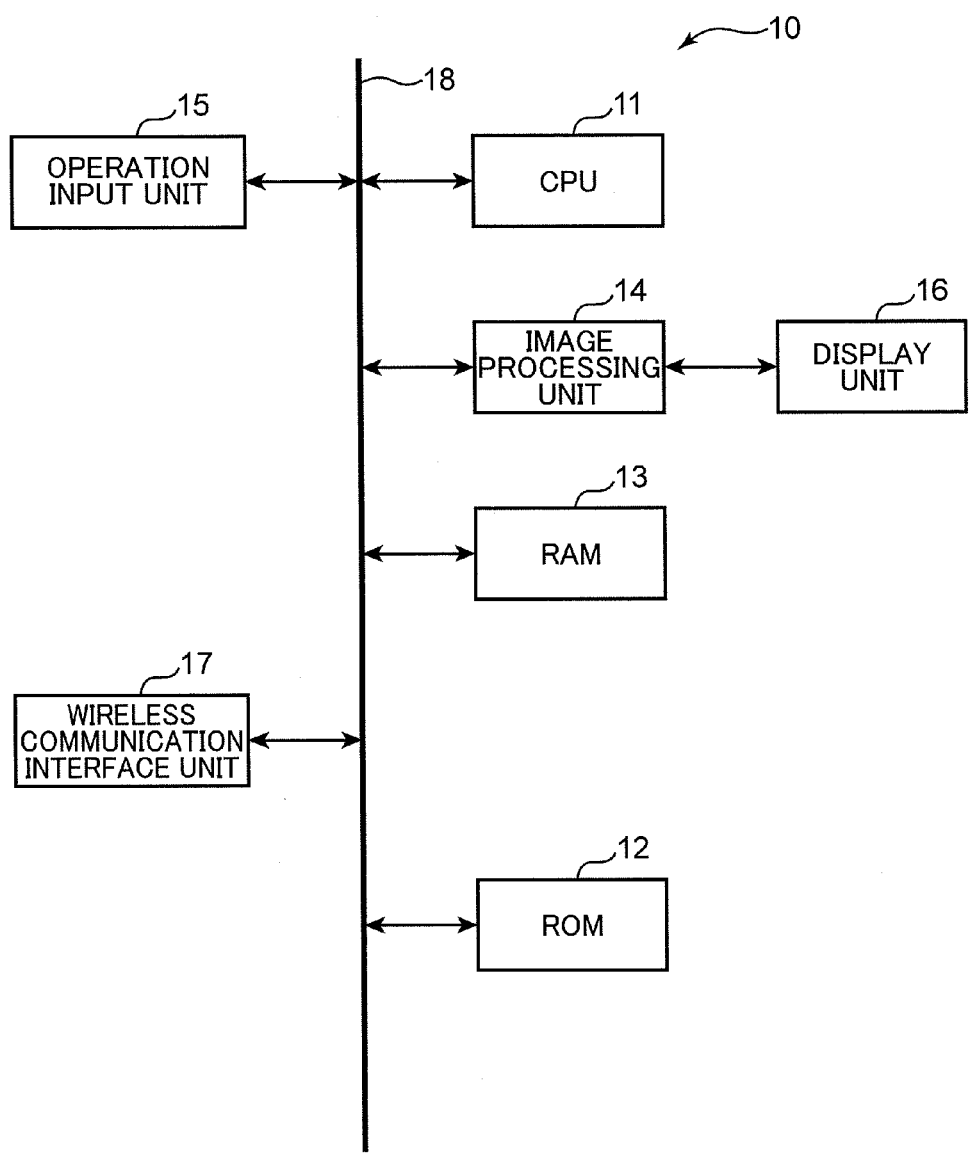
FIG. 2 is a block diagram showing the configuration of the communication terminal in the game system.
Figure 3B:
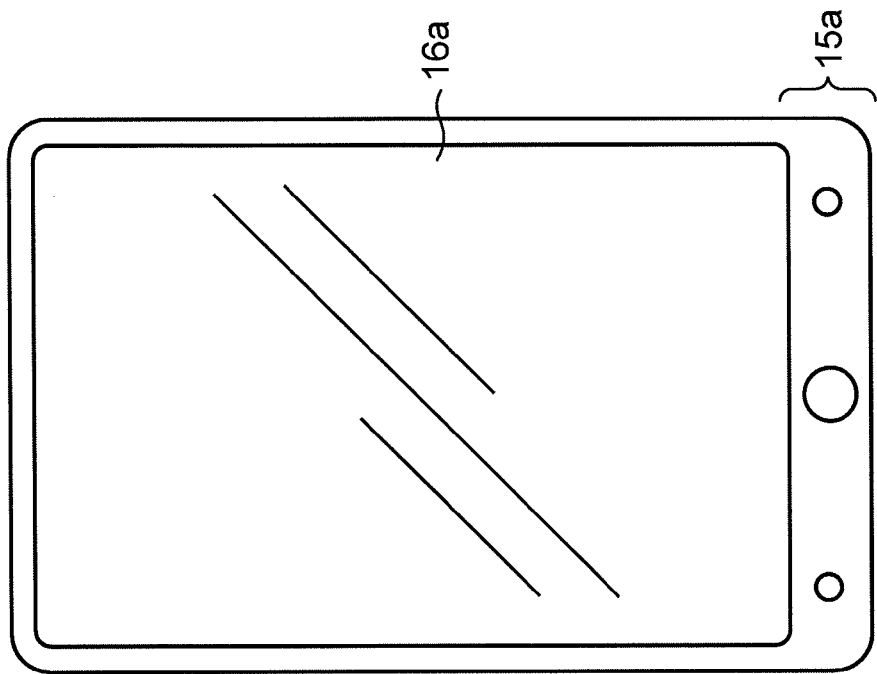
FIGS. 3A and 3B are diagrams showing the appearance of the communication terminal in the game system.
Figure 3A:
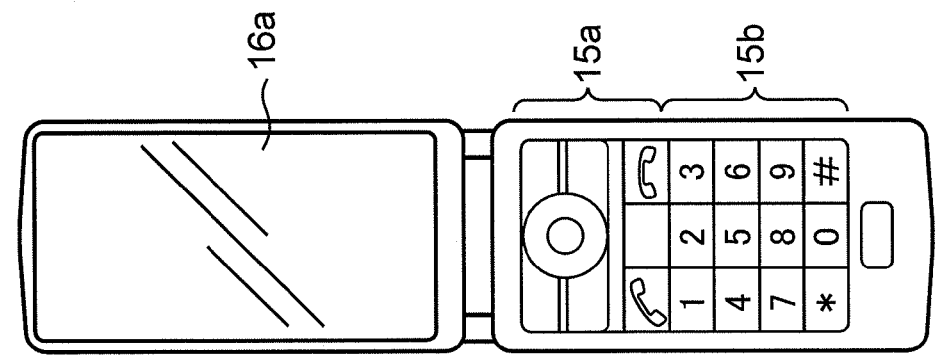

FIG. 2 is a block diagram showing the configuration of the communication terminal in the game system of one embodiment. FIG. 3 is a diagram showing the appearance of the communication terminal in the game system of one embodiment. FIG. 3A shows a case where the communication terminal is, for example, a button input-type terminal such as a foldable portable phone, and FIG. 3B shows a case where the communication terminal is, for example, a touch panel input-type terminal such as a smartphone.

In FIG. 2, the communication terminal 10 comprises a CPU (Central Processing Unit) 11, a ROM (Read Only Memory) 12, a RAM (Random Access Memory) 13, an image processing unit 14, an operation input unit 15, a display unit 16, and a wireless communication interface unit (hereinafter abbreviated as "wireless communication IF unit") 17, and a bus 18 is provided between the respective components for transmitting data such as control signals and data signals between the respective components.

The ROM 12 is a storage element for storing (loading) various programs required for operating the communication terminal 10, and various data required for executing the various programs. A web browser is stored (loaded) in the ROM 12. The RAM 13 is a storage element that functions as a so-called working memory of the CPU 11. Note that, in addition to the ROM 12 and the RAM 13, a rewritable nonvolatile storage element such as an EEPROM (Electrically Erasable Programmable Read Only Memory) may also be provided for storing data and application software to be downloaded from the site.

The CPU 11 controls the ROM 12, the RAM 13, the image processing unit 14, the operation input unit 15, the display unit 16 and the wireless communication IF unit 17 according to the programs based on their functions, and thereby governs the control of the overall communication terminal 10. The CPU 11 loads the web browser, which is stored in the ROM 12, into the RAM 13 and executes the web browser. In addition, based on the appropriate designation of the URL (Uniform Resource Locator) input by the user via the operation input unit 15 or the like, the CPU 11 acquires data for displaying the web page from the game server 20; that is, object data such as HTML (Hyper Text Markup Language) text or images associated with that text (hereinafter collectively referred to as "HTML data" as appropriate) via the wireless communication IF unit 17, and interprets the HTML data.

Note that, upon acquiring the HTML data, the CPU 11 notifies, to the game server 20 via the wireless communication IF unit 17, an access request message including the user ID (user identifying information) that is pre-registered in a rewritable nonvolatile storage element such as the EEPROM, or the user ID that was input via the operation input unit 15. The user identifying information is an identifier for specifying and identifying the user.

The web browser displays the web page provided from the game server 20 on the display unit 16 via the image processing unit 14 based on the acquired HTML data. Moreover, when the hyperlink or object on the web page is selected based on the user's operation of the operation input unit 15, the web browser requests the game server 20 send new HTML data for displaying the web page corresponding to the selected hyperlink or object. Note that the communication terminal 10 may also be loaded with various plug-in functions (for example, an animation function) for expanding the browsing function of the web browser.

The image processing unit 14 displays the web page on the display unit 16 based on the display image data that is provided from the CPU 11 as the analysis result of the HTML data. The display unit 16 is, for example, an LCD (Liquid Crystal Display) monitor including a thin film transistor that is disposed in a matrix in pixel units, and displays the image of the web page by driving the thin film transistor based on the display image data. The wireless communication IF unit 17 is an interface circuit that is connected to the communication network NW, and sends and receives communication signals to and from the game server 20 via the communication network NW. The wireless communication IF unit 17 creates communication signals according to the communication protocol of the communication network NW based on the data from the CPU 11, and converts the communication signals from the communication network NW into data of a format that can be processed by the CPU 11.

When the communication terminal 10 is a button input-type as shown in FIG. 3A, the operation input unit 15 comprises a button group 15a including a plurality of command input button such as a direction command button and a select button and a button group 15b including a plurality of command input buttons such as a numeric keypad for receiving the user's operation input, and includes an interface circuit for recognizing the push input (operation input) of the respective buttons and outputting the push input (operation input) to the CPU 11. For example, the direction command button instructs the CPU 11 to scroll and display the web page that is being displayed on the display unit 16. Moreover, the select button notifies the CPU 11 that the user selected one hyperlink or object that is being actively displayed (for example, highlighted) when a plurality of hyperlinks or objects are displayed on the web page. Note that, when the communication terminal 10 is configured from a compact portable terminal, these buttons are preferably positioned on the front face of the communication terminal 10 so that the game player can easily operate the buttons with one's thumb while holding the communication terminal 10 with one hand. In the example shown in FIG. 3A, the button group 15b is positioned below the button group 15a, and includes a plurality of input command buttons (numeric keypad) shown as "0" to "9", "*", "#".

Moreover, when the communication terminal 10 is a touch panel input-type as shown in FIG. 3B, the operation input unit 15 is a touch panel that mainly receives inputs by the using touching the display screen 16a with one's fingertip or a pen. This touch panel may be a well-known type such as a so-called capacitive sensing-type. Note that the communication terminal 10 of the touch panel input-type may also be additionally provided with the button group 15a.

In this kind of communication terminal 10, the operation input (command input) of the menu on the web page is performed by selecting the menu with the push operation of the direction command button, and finalizing the selected menu with the push operation of the select button, for example, when the communication terminal 10 is the button input-type. Moreover, for example, when the communication terminal 10 is a touch panel input-type, the operation input (command input) of the menu on the web page is performed by commanding (sliding, tapping, swiping, dragging) the position of the menu on the display screen 16a displayed on the web page with one's fingertip or a pen.

<Explanation of Configuration of Game Server>

Figure 4:
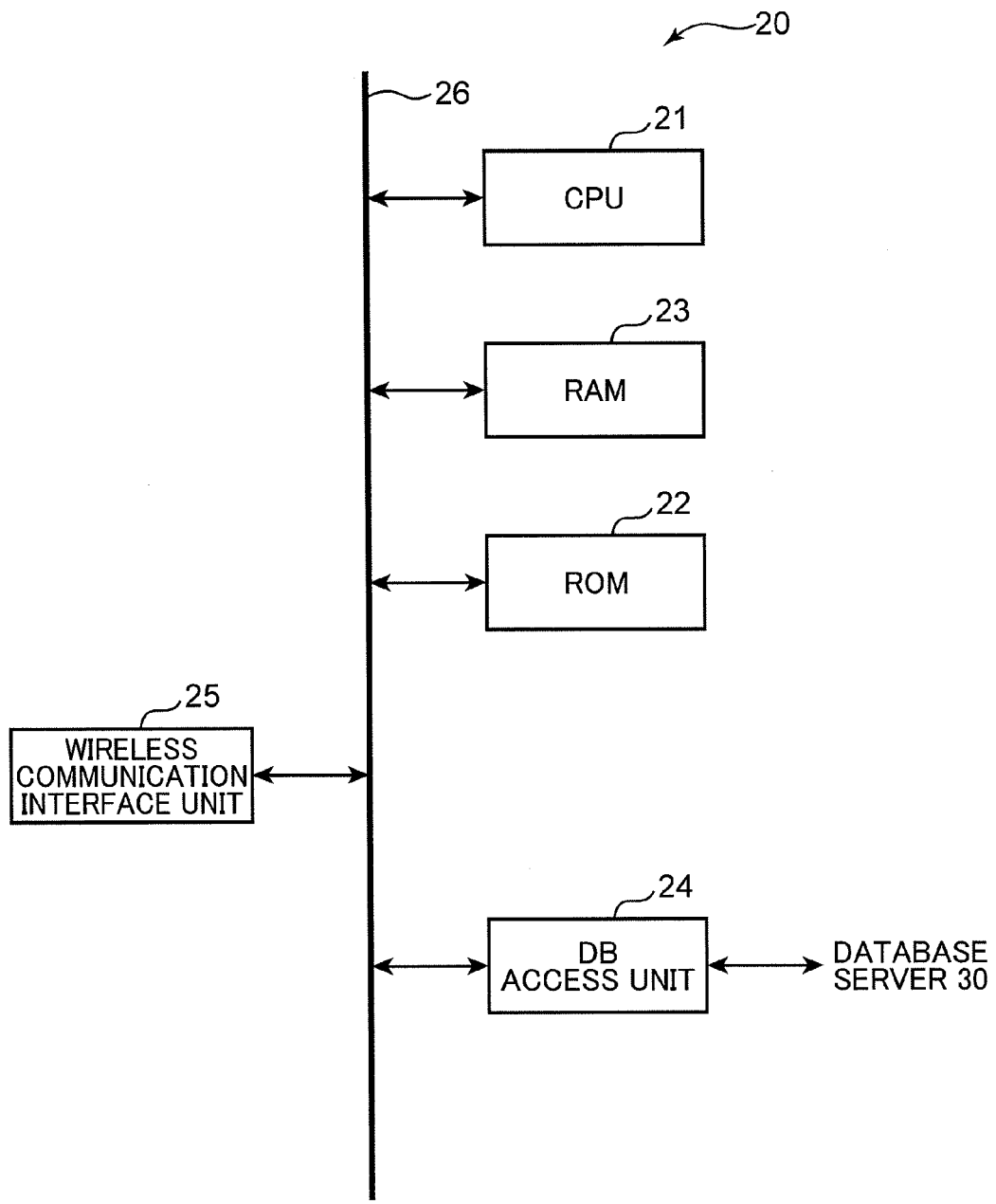
FIG. 4 is a block diagram showing the configuration of the game server in the game system.

FIG. 4 is a block diagram showing the configuration of the game server in the game system of one embodiment. In FIG. 4, the game server 20 manages a website of a competition game configured from, for example, a plurality of web pages of a hierarchical structure, and provides a web service of a competition game to the communication terminal 10 as a client.

Here, while explained is an example of a case of a competition game including competitive elements between the characters associated with the user ID of the user (game player), the game is not limited thereto, and the game will suffice so long as it is a game that uses a plurality of characters and includes, as its function, composite processing of compositing another character with a predetermined character. For example, the game may also be a race horse fostering game or a horse racing game including, as its function, composite processing of compositing the abilities of another race horse character with the abilities (for example, explosive power at the start of the race, stamina, explosive power toward the end of the race, vigor, and so on) of a predetermined race horse character. Note that, in the foregoing case, the composition may also be enhancement processing of compositing the parameter values of another race horse character with the parameter values of a predetermined race horse character, erasing the other race horse character, and updating the parameter values with the composited parameter values as the parameter values of the predetermined race horse character. Moreover, the composition may also be crossbreeding processing of compositing the parameter values of another race horse character with the parameter values of a predetermined race horse character, erasing both the predetermined race horse character and the other race horse character, and creating a new race horse character having the composited parameter values. Moreover, for example, the game may also be a combat game having, as its function, composite processing of compositing the abilities of another combatant character with the abilities (for example, stamina, fighting skill and the like) of a predetermined combatant character. Moreover, for example, the game may also be a car race game having, as its function, composite processing of compositing the performance of another racing car character with the performance (for example, speeding, cornering ability, mileage and the like) of a predetermined racing car character. Moreover, for example, the game may also be a dating game having, as its function, composite processing of compositing the personality of another human being character with the personality (for example, kindness, thoughtfulness and the like) of a predetermined human being character. Moreover, for example, the game may also be a grand navigation game of configuring a fleet with a plurality of merchant vessels having, as its function, composite processing of compositing a character of parts for improving the performance with a predetermined merchant vessel character.

In the ensuing explanation, explained as an example of the competition game is a sports game, in particular a baseball game (digital card game). With this baseball game, each user has a team consisting of a plurality of baseball players (characters), and each user aims to raise one's team (that is, the user) to a higher class (or higher position or ranking) by improving the abilities of these baseball players and competing with other users. Here, each baseball player is displayed on the user's communication terminal 10 in card form. Displayed on the surface of the card (baseball player card) is the appearance of the respective baseball players during the game and the abilities of the baseball players. In the game, performed are, for example, the collection of the baseball player corresponding to the baseball player card, update (enhancement) of abilities, and competition with the other user's team.

The game server 20 to provide this kind of competition game comprises, for example, as shown in FIG. 4, a CPU 21, a ROM 22, a RAM 23, a database access unit (hereinafter abbreviated as "DB access unit") 24, and a wireless communication IF unit 25, and a bus 26 is provided between the respective components for transmitting data such as control signals and data signals between the respective components. Note that the game server 20 may have the same configuration as a general purpose web server in relation to hardware.

The ROM 22 is a storage element for storing an application program (game program of this embodiment) that provides the service of displaying HTML text and objects such as images (web pages) on the web browser of the communication terminal 10 as the client. The RAM 23 is a storage element that functions as a so-called working memory of the CPU 21.

The CPU 21 controls the ROM 22, the RAM 23, the DB access unit 24 and the wireless communication IF unit 25 according to the programs based on their functions, and thereby governs the control of the overall game server 20. The CPU 21 loads the game program, which is stored in the ROM 22, into the RAM 23 and executes the game program, and additionally performs various types of processing for the communication terminal 10 that is communicably connected with the communication network NW via the wireless communication IF unit 25.

For example, the CPU 21 sends HTML data to the communication terminal 10 via the wireless communication IF unit 25. Note that, when the game server 20 is to perform authentication processing of the user of the communication terminal 10, the CPU 21 may perform the authentication processing. The CPU 21 performs processing according to the hyperlink or object selected by the user on the web page displayed by the communication terminal 10 via the wireless communication IF unit 25. This processing includes, for example, sending of new HTML data, or arithmetic processing or data processing in the game server 20.

The DB access unit 24 is an interface circuit that is used when the CPU 21 is to read and write data from and to the database server 30.

The wireless communication IF unit 25 is an interface circuit that is connected to the communication network NW, and sends and receives communication signals to and from the communication terminal 10 via the communication network NW. The wireless communication IF unit 25 creates communication signals according to the communication protocol of the communication network NW based on the data from the CPU 21, and converts the communication signals from the communication network NW into data of a format that can be processed by the CPU 21.

<Explanation of Configuration of Database Server>

Figure 5:
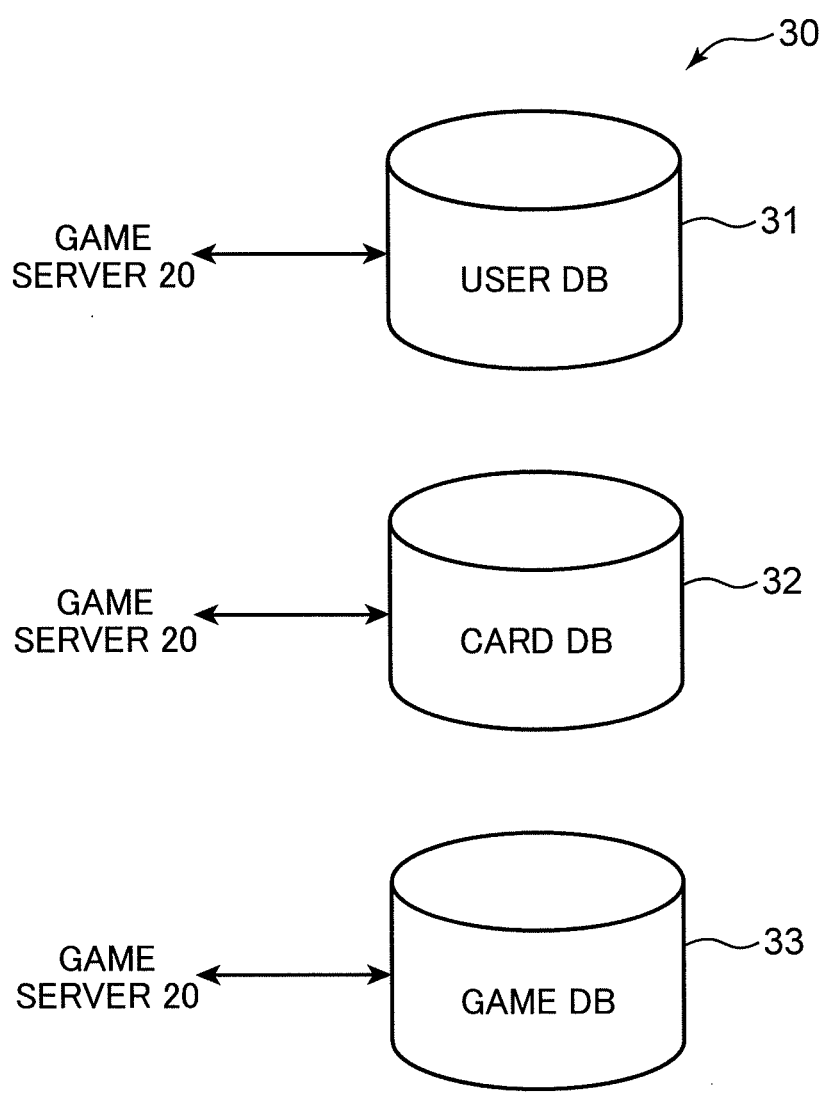
FIG. 5 is a block diagram showing the configuration of the database servers in the game system.

FIG. 5 is a block diagram showing the configuration of the database servers in the game system of one embodiment. FIG. 6 is a diagram showing the configuration of the user database included in the database server depicted in FIG. 5. FIG. 6A shows a configuration example of a database storing user data, and FIG. 6B shows a configuration example of a database storing order data. FIG. 7 is a diagram showing the configuration of the card database included in the database server depicted in FIG. 5. FIG. 7A shows a configuration example of a database storing data (total card data) of all issued baseball player cards, and FIG. 7B shows a configuration example of a database storing data (type-based card data) of type-based baseball player cards.

The DB server 30 is a device for managing various data required for the game server 20 to provide a competition game to the communication terminal 10, outputting the various data to the game server 20 according to a request of the game server 20, and updating the various data, and can be realized with a large-capacity hard disk device or a device in the format of RAID (Redundant Arrays of Inexpensive Disks), or a general-purpose storage apparatus. The respective databases in the DB server 30 are configured to enable the reading and writing of data from the CPU 21 via the DB access unit 24 of the game server 20.

FIG. 5 shows an example of databases for realizing a digital card game, and the DB server 30 comprises a user database (hereinafter abbreviated as "user DB") 31, a card database (hereinafter abbreviated as "card DB") 32, and a game database (hereinafter abbreviated as "game DB") 33.

The user DB 31 is a database for storing information (data) relating to the users who are registered in the game, and comprises, for example, a user data database (hereinafter abbreviated as "user data DB") 311 for storing user data, and an order data database (hereinafter abbreviated as "order data DB") 312 for storing order data.

The user data DB 311 comprises, for example, as shown in FIG. 6A, a user ID field as a field for storing the user ID, a user name field as a field for storing the user name, a display image field as a field for storing the file name of a display image, a team field as a field for storing the team selected by the user, a skill level field as a field for storing the skill level, an action point field as a field for storing the action points, a management point field as a field for storing the management points, an enhancement point field as a field for storing the enhancement points, a cheering point field as a field for storing the cheering points, a number of baseball players field as a field for storing the number of baseball players retained by the user of the user ID, and a fellow game player field as a field for storing the fellow game players of the user of the user ID, and is configured by a record being created for each user ID.

The user ID is an identifier for specifying and identifying the user registered in the game. The user name and the display image are the name and the image that are displayed on the communication terminal 10 for identifying the user upon executing the game. The user name is text of a predetermined length or shorter which is designated in advance by the user, and the display image is, for example, the avatar image that is selected in advance by the user. Moreover, the user name is a name for identifying the user in a network environment (or community) provided by the game server 20. The team is a team (baseball club) designated by the user upon user registration in a digital card game of a baseball format. In this game, for example, provided are a P league consisting of six teams of P1 to P6, and a Q league consisting of six teams of Q1 to Q6, and the user selects one team among these twelve teams. The skill level is data showing the skill level of the user in the game. For example, there are level values in a range from Lv1 (level 1) to Lv100 (level 100), and higher the level value, higher the skill.

The action points are points that are required, for example, for the user to scout baseball players in a baseball-type digital card game. The value of action points is reduced (consumed) as a result of scouting baseball players, and increased (recovered) after the lapse of a predetermined time. The management points are points that are required, for example, for the user to compete in a baseball-type digital card game. The value of management points is reduced (consumed) as a result of competing with another user, and increased (recovered) after the lapse of a predetermined time. The enhancement points are points that are required, for example, for the user to enhance the baseball player card in a baseball-type digital card game. The value of enhancement points are reduced (consumed) as a result of performing enhancement processing of the baseball player card, and increased (recovered) as a result of satisfying the predetermined enhancement point addition conditions for adding a given number of points to the enhancement points such as by winning the competition against the other user, or after the lapse of a predetermined time. The cheering points are points that are acquired, for example, by sending a cheering message to the user of a fellow game player in a baseball-type digital card game.

The number of baseball players is the total number of baseball player cards retained by the user in a baseball-type digital card game. The number of baseball players will increase/decrease as a result of performing scout processing or enhancement processing. The maximum value of the number of baseball players is prescribed in advance (for example, a maximum value of 60). The fellow game player is data of the other user ID as the fellow game player of the target user ID.

The order data DB 312 is a database for storing information (data) regarding the batting order of the fielders designated by the user and the pitcher rotation (starting pitcher, relief pitcher, closer) upon competing in the game, and is created for each user ID. The order data DB 312 comprises, for example, as shown in FIG. 6B, a batting order/pitcher rotation field as a field for storing the batting order or pitcher rotation, a serial key field as a field for storing the serial key, a position field as a field for storing the position, an ability field as a field for storing the ability, and a card No. field as a field for storing the card number, and comprises records corresponding to the number of baseball player cards capable of getting on the bench.

The batting order is the hitting order of the baseball player card (character) that is used when going to bat in a baseball-type digital card game. The pitcher rotation is the order of replacing the pitcher of the baseball player card in a baseball-type digital card game. The serial key is an identifier for specifying and identifying the baseball player card in a baseball-type digital card game, and is a serial number that is given to the issued baseball player card each time a baseball player card is issued. The position is the fielding position of the baseball player card that is used when fielding in a baseball-type digital card game. The ability is an ability as the parameters of the baseball player card in a baseball-type digital card game. In the example shown in FIG. 6B, the ability is represented with the respective items of "batting power," "running ability" and "fielding skill", and correspondingly the ability field includes a batting power sub field as a field for storing the batting power, a running ability sub field as a field for storing the running ability, and a fielding skill sub field as a field for storing the fielding skill. The ability value as the numerical value that represents the level of ability is a value within a range of 0 to 1000, and larger the ability value, greater the ability. For example, with the baseball player card in which the serial key shown in FIG. 6B is 1, an example is shown where the batting power is 310, the running ability is 450, and the fielding skill is 810. In FIG. 6B, while "batting power," "running ability," and "fielding skill" are illustrated as items to be used as the index of ability in cases where the baseball player card is a fielder, if the baseball player card is a pitcher, different items such as "pitch speed," "pitching control," and "stamina" may be used, or the respective sub fields of pitch speed, pitching control and stamina may also be provided to the ability field in addition to the respective sub fields of batting power, running ability and fielding skill.

The card number is an identifier for specifying and identifying the type of baseball player card (character) in a baseball-type digital card game, and is given for each type of baseball player card.

The card DB 32 is a database for storing information (data) relating to the baseball player card appearing in a baseball-type digital card game, and comprises, for example a total card data database (hereinafter abbreviated as "total card data DB") 321, and a type-based card database (hereinafter abbreviated as "type-based card data DB") 322.

The total card data DB 321 is a database for storing information relating to all baseball player cards that were issued in a baseball-type digital card game. The total card data DB 321 comprises, for example, as shown in FIG. 7A, a serial key field as a field for storing the serial key, a card No. field as a field for storing the card number, an issue time field as a field for storing the issue time, an acquisition time field as a field for storing the acquisition time, a last update time field as a field for storing the last update time, an initially held user ID field as a field for storing the initially held user ID, a currently held user ID field as a field for storing the currently held user ID, a rarity field as a field for storing the rarity, and an ability field as a field for storing the ability, and is configured by a record being created for each serial key; that is, for each issued baseball player card.

The issue time is the time that the baseball player card was issued. The acquisition time is the time that the user of the user ID registered in the currently held user ID field acquired the baseball player card. The last update time is the last time (most recent update time) that data stored in any field of the record was updated (rewritten). The initially held user ID is the user ID of the user who initially held the baseball player card (held the baseball player card when it was issued) of the serial key registered in the serial key field. The currently held user ID is the user ID of the user who is currently holding the baseball player card of the serial key registered in the serial key field. The rarity is an index showing the level of scarcity (rarity value) of the baseball player card of the serial key registered in the serial key field, and the rarity is set such that, higher the value, lower the probability that the baseball player card will appear in the game. In other words, the higher the value, the higher the scarcity. Note that, in this embodiment, the rarity is represented in the five levels of 1 to 5, and the rarity of a baseball player card corresponding to a baseball player with a distinguishing technical ability or a popular baseball player is set to be high.

Moreover, the ability field includes a total ability level sub field as a field for storing the total ability level, a batting power sub field as a field for storing the batting power, a running ability sub field as a field for storing the running ability, and a fielding skill sub field as a field for storing the fielding skill. The total ability level is an index showing the level of comprehensive ability of the respective abilities of batting power, running ability and fielding skill, and is the simple average value or the weighted average value of the respective ability values of the respective abilities. While the weighting upon obtaining the weighted average value may be suitably set, for instance, in this embodiment, the respective weighting of batting power, running ability and fielding skill is set to 0.4, 0.2 and 0.4.

Note that, at the time that the baseball player card is issued, the ability value of the baseball player card is set to a default value. In other words, the CPU 21 of the game server 20 accesses the card DB 32 upon newly issuing a baseball player card, writes default data in the ability value of this issued baseball player card, and the card DB 32 stores the default value of the ability value.

The foregoing rarity, total ability level, batting power, running ability and fielding skill are parameters of the baseball player card, but the parameters of the baseball player card may also include the team (one among P1 to P6 and Q1 to Q6), position (pitcher, catcher, first baseman, left fielder or the like), and influence that the baseball player card has on the game (typically a positive influence).

The type-based card data DB 322 is a database for storing information related to the baseball player card, based on type, in a baseball-type digital card game. The type-based card data DB 322 comprises, for example, as shown in FIG. 7B, a card No. field as a field for storing the card number, a name field as a field for storing the name, a basic ability field as a field for storing the basic ability, and an image data name field as a field for storing the file name of the image data, and is configured by a record being created based on the type of baseball player card.

The name is the name of the baseball player card of the card number registered in the card No. field. The basic ability is the initial value (default value) of the ability in the baseball player card of the card number registered in the card No. field. The basic ability field includes a batting power sub field as a field for storing the batting power, a running ability sub field as a field for storing the running ability, and a fielding skill sub field as a field for storing the fielding skill. The image data file name is the file name that is given to the image data of the baseball player card of the card number registered in the card No. field.

Moreover, the game DB 33 is a database for storing information regarding the setting of the game to be executed by the game server 20 and information related to the result of the game (game result) based on an access from the game server 20, and the foregoing information is updated as needed. Information related to the game result may include various information depending on the nature of the game. In the case of a baseball-type digital card game, information related to the game result includes the results (scores) of competitions between different user IDs.

<Explanation of Game Control Device>

Figure 8:
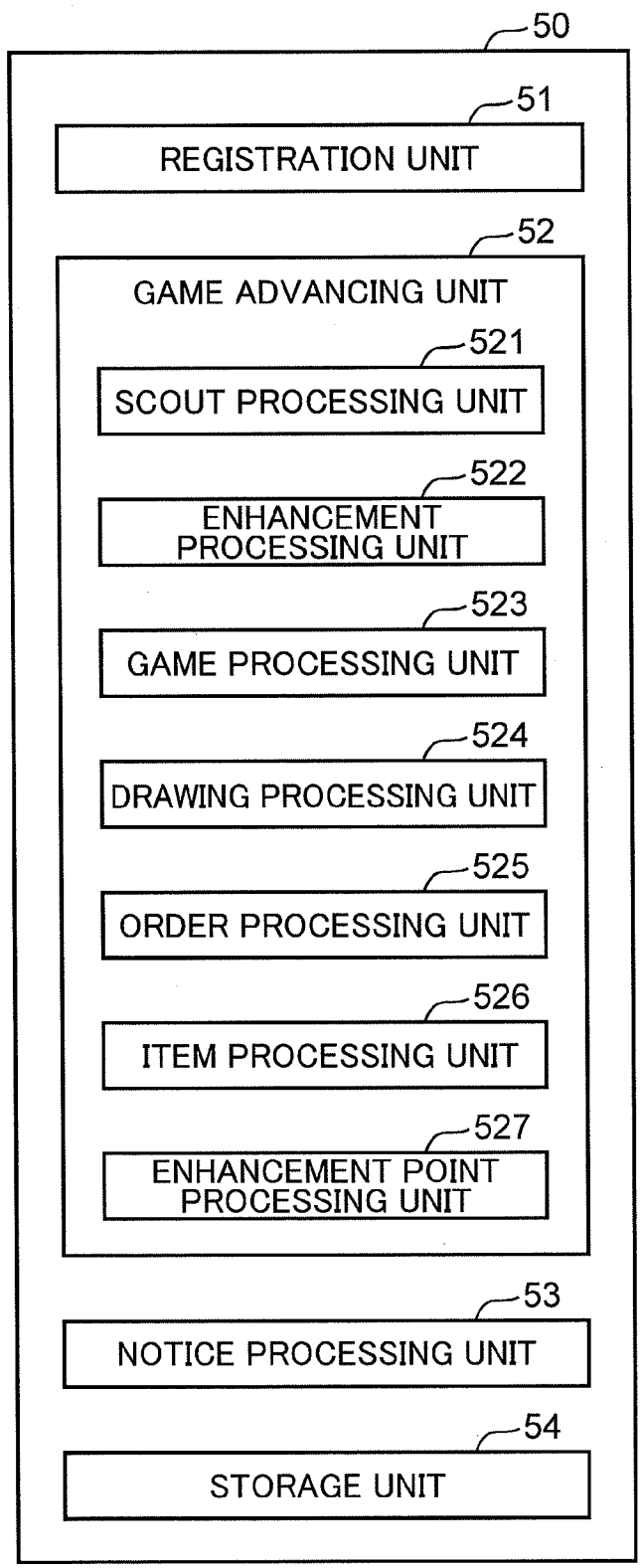
FIG. 8 is a functional block diagram explaining the functions that play the main roles of the game control device in the game system.
Figure 9:
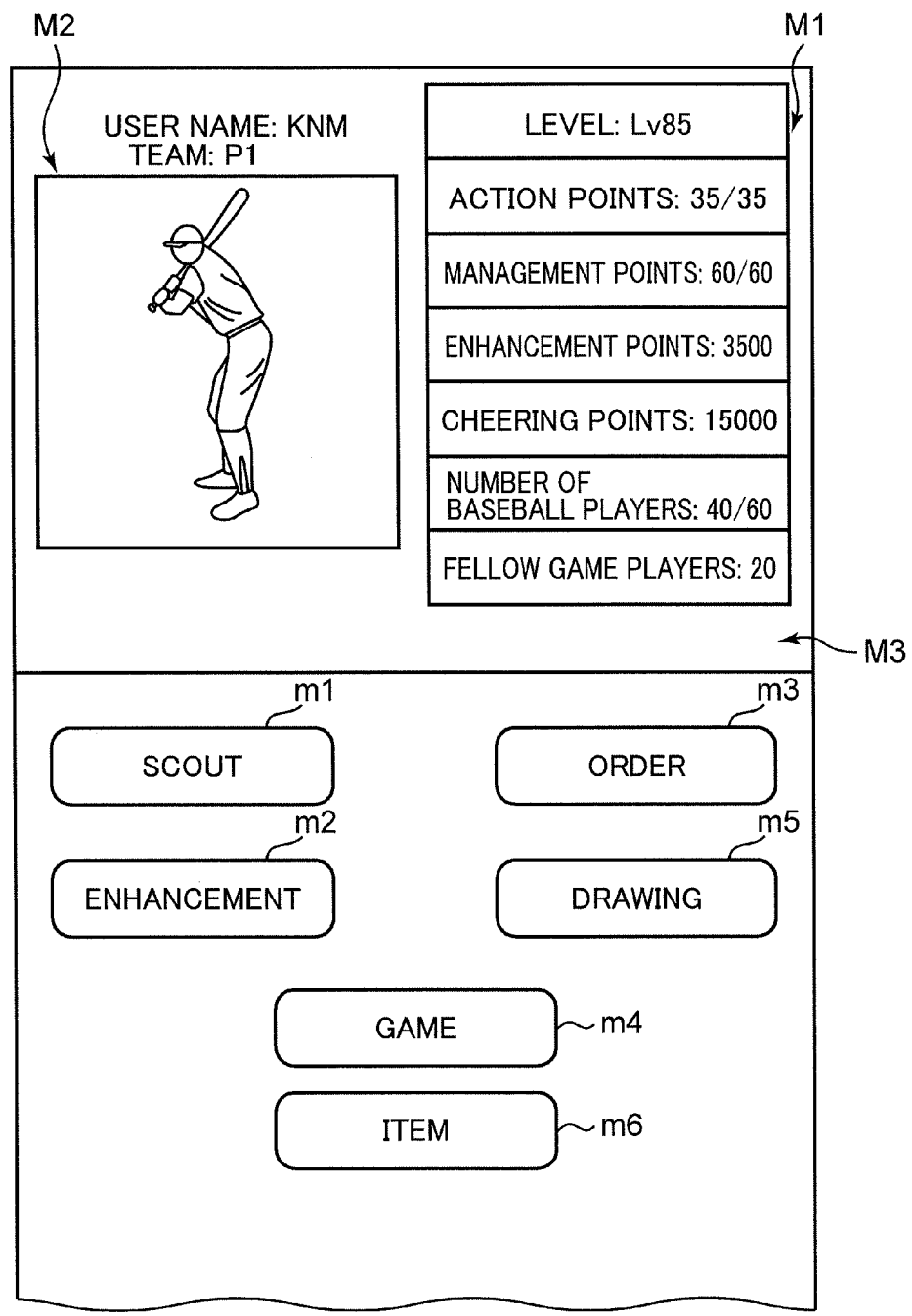
FIG. 9 shows an example of a web page that is displayed on the communication terminal by the game advancing unit of the game control device.

FIG. 8 is a functional block diagram explaining the functions that play the main roles of the game control device in the game system of one embodiment. FIG. 9 shows an example of a web page that is displayed on the communication terminal by the game advancing unit of the game control device.

In FIG. 8, the game control device 50 is configured from the foregoing game server 20 and DB server 30 in this embodiment. In order to realize the baseball game, the game control device 50 of this embodiment comprises, for example, as shown in FIG. 8, a registration unit 51, a game advancing unit 52, a notice processing unit 53, and a storage unit 54.

The registration unit 51 is used for registering the user to participate in the baseball game, and, for example, is used for executing registration processing of user registration upon recognizing the user's request based on an appropriate operation input into the communication terminal 10 on the web page provided by the communication terminal 10.

More specifically, the registration unit 51 is functionally configured in the CPU 21 of the game server 20 based on the execution of a program, and the registration processing is executed as follows. Foremost, the CPU 21 of the game server 20 receives, from the communication terminal 10, a registration request message including information to the effect of requesting user registration via the wireless communication IF unit 17 of the communication terminal 10, the communication network NW and the wireless communication IF unit 25. Note that the game server 20 and the communication terminal 10 mutually send and receive data via the wireless communication IF unit 17 of the communication terminal, the communication network NW and the wireless communication IF unit 25 of the game server 20 as described above, but the explanation thereof is omitted below. The web page may also be configured so that the registration message is automatically generated based on a predetermined operation (for instance, selection operation of a predetermined menu, text input or the like) to the communication terminal 10 on the web page provided from the game server 20. The registration request message may also include information (for example, IP address, email address and the like) for identifying the communication terminal 10 of the sender, or, when the user is already using another game provided by the same service provider, the registration request message may also include the user ID of that user.

The CPU 21 receives the registration request message, and when the user ID is not included in the registration request message, newly issues a user ID and performs the registration processing of that user ID, and thereafter sends, to the communication terminal 10, a registration processing completion message including information to the effect that the registration processing is complete. Meanwhile, when the CPU 21 receives the registration request message and the user ID is included in the registration request message, the CPU 21 performs the registration processing of that user ID, and thereafter sends, to the communication terminal 10, a registration processing completion message including information to the effect that the registration processing is complete.

When the registration processing is complete, the CPU 21 stores, in the user DB 31, user data describing predetermined default data of the newly registered user ID.

Moreover, with a request based on a user ID as the trigger, the registration unit 51 may also register that user ID by associating with another user ID. In other words, the registration unit 51 may register another user ID as a so-called "fellow game player" relative to the user ID. Note that, in the ensuing explanation, the user ID being related to a fellow game player and the corresponding user being related to a fellow game player are synonymous.

More specifically, the registration processing of a fellow game player is performed as follows. The CPU 21 of the game server 20 receives a request message (request) designating the user ID (or corresponding user name) of the intended fellow game player from the communication terminal 10 of a user corresponding to a certain user ID. The sending of this request message is set in advance as a function of the web page provided to the user's communication terminal 10. When the CPU 21 receives this request message, at the timing of access based on the user ID included in the request message, the CPU 21 sends, to the communication terminal 10 corresponding to that user ID, HTML data for displaying a web page in order to request to return the approval or disapproval of the request based on the other user ID. When information to the effect of approving the request is returned, the CPU 21 registers both users as fellow game players. More specifically, the CPU 21 writes data indicating that both users are mutually fellow game players in the field of "fellow game player" of user data in the two corresponding user IDs in the user DB 31.

The game advancing unit 52 is used for advancing the game displayed on the user's communication terminal 10 by sending, to the communication terminal 10, HTML data for sequentially updating the web page displayed on the communication terminal 10 according to the user's operation of the communication terminal 10. More specifically, the game advancing unit 52 is functionally configured in the CPU 21 of the game server 20 based on the execution of a program. With the game advancing unit 52, the CPU 21 of the game server 20 sends, to the communication terminal 10, HTML data for displaying the web page according to the user's selection of the hyperlink or object on the web page. The CPU 21 sequentially sends new HTML data according to the user's selection of the hyperlink or object on the web page, and the user recognizes the advancement of the game as a result of the web page displayed on the communication terminal 10 being sequentially switched.

With this baseball-type digital card game, various types of processing are provided in this embodiment upon advancing the game; namely, scout processing, enhancement processing, game processing, drawing processing, order processing and item processing. The game advancing unit 52 correspondingly comprises a scout processing unit 521, an enhancement processing unit 522, a game processing unit 523, a drawing processing unit 524, an order processing unit 525, and an item processing unit 526, and additionally comprises an enhancement point processing unit 527 for processing the increase/decrease of enhancement points.

The scout processing is processing of searching for baseball player cards in order to create one's own team, and is executed and processed by the scout processing unit 521. By executing the scout, action points are consumed on the one hand, and enhancement points are increased on the other.

The enhancement processing is processing of integrating (compositing) two or more baseball player cards by consuming enhancement points and thereby increasing the ability of a specific baseball player card, and is executed and processed by the enhancement processing unit 522. The enhancement processing unit 522 will be described later in detail.

The game processing is processing of playing a baseball game with a team of another user, and is executed and performed by the game processing unit 523. Management points are consumed by playing the game on one hand, and enhancement points are increased by winning the game on the other.

The drawing processing is processing of acquiring a baseball player card through drawing by consuming cheering points, and is executed and performed by the drawing processing unit 524.

The order processing is processing of the user changing the order of the baseball player card and replacing that baseball player card with a reserve baseball player card, and is executed and processed by the order processing unit 525.

The item processing is processing of the user confirming the contents of the items retained in the game, and is executed and performed by the item processing unit 256. Here, an item is used for advancing the game advantageously, and may include various types and forms. For example, an item may be a piece of equipment (weapon, protective gear or the like) for enhancing the character's ability, an item (card, food, fuel or the like for improving the ability) for improving the character's ability according to predetermined scenes or situations, or an outfit (clothing, shows, accessories or the like) for decorating the character. An item may be given to the user through purchase, or given to the user by satisfying predetermined conditions in the game that are set in advance such as successively winning competitions or the team reaching a predetermined ranking.

The enhancement point processing unit 527 is used for performing addition processing of adding a given number of points to the enhancement points and subtraction processing of subtracting a given number of points from the enhancement points.

Here, in order to realize the game advancing unit 52, the CPU 21 of the game server 20 assigns in advance one of the processing for advancing the game to the respective menus displayed on the web page. In addition, when a menu on the web page is selected in the communication terminal 10, the CPU 21 receives information regarding the selected menu from the communication terminal 10, and executes the processing assigned to the selected menu based on the received information.

More specifically, the game advancing unit 52 displays on the communication terminal 10, for example, as shown in FIG. 9, a plurality of menus to which are respectively assigned a plurality of types of processing to be executed in the game. In other words, the CPU 21 of the game server 20 generates HTML data for displaying the web page including the plurality of menus on the communication terminal 10, and sends the generated HTML data to the communication terminal 10.

The web page shown in FIG. 9 is the top web page that is displayed when the user accesses the website of the baseball game provided by the game server 20 through the communication terminal 10, and corresponds to the main menu of the baseball game. This top page is configured with a web page corresponding to individual user IDs. The top web page shown in FIG. 9 includes, for example, in addition to the respective texts of the user name and the team, a user data display area M1, a baseball player image display area M2 and a menu display area M3.

The user data display area M1 is an area for displaying data of the respective items of skill level, action points, management points, enhancement points, cheering points, number of baseball players, and fellow game player included in the user data of the target user ID. Note that, in the items displayed in the user data display area M1, with regard to the points or numbers represented with the X/Y format, X shows the points or numbers held by the user, and Y shows the maximum value of such points or numbers.

The baseball player image display area M2 is an area for displaying the image data of the baseball player card that was selected by the user in advance.

The menu display area M3 is an area for displaying the respective menus corresponding to the plurality of types of processing provided to a baseball-type digital card game, and receiving commands. In this embodiment, as shown in FIG. 9, as the basic menu, the menu display area M3 displays the respective texts of "scout" m1, "enhancement" m2, "order" m3, "game" m4, "drawing" m5, and "item" m6 within a predetermined area (object) in a hyperlinked state. Furthermore, for example, when one of the texts is selected as a result of the user pushing (tapping) the corresponding location with one's fingertip, the display switches to a screen for executing the contents of the respective texts, and the execution of the contents of the respective texts is advanced.

The "scout" m1 is a menu for instructing the execution of the scout processing. When the "scout" m1 is selected, for example, a map of Japan in a state of being partitioned into a plurality of regions is displayed on the communication terminal 10. When an operation of selecting the intended region is performed by the user in the foregoing display state, a predetermined character is acquired via drawing from the selected region, and becomes the user's character.

The "enhancement" m2 is a menu for instructing the execution of the enhancement processing. When the "enhancement" m2 is selected, a plurality of characters are integrated according to the user's operation, and the ability of the character designated by the user is consequently enhanced. The enhancement processing will be described later in detail.

The "order" m3 is a menu for instructing the execution of the order processing. When the "order" m3 is selected, for example, in the case of a baseball game, information regarding the fielder's batting order or pitcher rotation (starting pitcher, relief pitcher, closer) is displayed together with the character's image, ability and the like. The batting order and pitcher rotation can be changed based on the user's operation in this display state.

The "game" m4 is a menu for instructing the execution of the game processing. When the "game" m4 is selected, competition with another user is carried out. For example, information of the other user (user of the other user ID) to become the opponent is displayed as a list, for example, together with an avatar image. The user selects the intended opponent from this list based on an operation, and competes with the selected opponent.

The "drawing" m5 is a menu for instructing the execution of the drawing processing. When the "drawing" m5 is selected, for example, a character is selected via drawing from a group consisting of a plurality of characters, and the selected character is given to the user. Since the game balance will be lost if drawing is enabled without limitation, for example, the number of times that drawing can be performed per day is limited to a predetermined number of times such as once or twice a day.

The "item" m6 is a menu for instructing the execution of the item processing. When the "item" m6 is selected, the items held by the user in the game are displayed on the communication terminal 10.

In this kind of top web page, when the user selects one of the texts shown in FIG. 9 by pushing (tapping) the corresponding location on the display unit 16 of the communication terminal 10 with one's fingertip, with the game advancing unit 52, the CPU 21 of the game server 20 recognizes the result of user's selection result, and sends new HTML data to the communication terminal 10. Consequently, a new web page corresponding to the user's selection result is displayed on the display unit 16 of the communication terminal 10.

The notice processing unit 53 is used for notifying the user's communication terminal 10 of the ranking (position) for each user ID based on the competition result during the period for each predetermined period.

The storage unit 54 is used for storing the parameter values of the character by associating the parameter values with the respective user IDs. In this embodiment, the storage unit 54 is realized by the game player DB 31 of the DB server 30.

In the game control device 50 having the foregoing configuration corresponding to a baseball-type digital card game, a baseball player card is an example of a character, enhancement is an example of a composition, and rarity and ability, the respective abilities of batting power, running ability and fielding skill in this embodiment, are examples of parameters. The enhancement points are an example of the composition points that are consumed upon compositing another character with a predetermined character. The user data DB 311 of the DB server 30 is an example of the composition point storage unit, and the enhancement point processing unit 527 is used for updating the composition point storage unit, and, when the user's predetermined operation input is executed to the communication terminal 10, is an example of the composition point processing unit for executing point addition processing of adding predetermined additional points to composition points corresponding to the user ID of the user based on information related to the operation input. The enhancement processing unit 522 is an example of the character composition unit for compositing parameter values of another character with parameter values of a predetermined character based on information related to the user's operation input to the communication terminal 10, and causing a character having the composited parameter value to appear.

Note that, in the foregoing explanation, when various programs or various data such as data required for the operation of such programs are not stored in the respective devices, they may be installed from a storage medium recording such programs and data into the respective devices, or downloaded from a server computer (not shown) managing such programs and data via the communication network NW.

<Explanation of Flow of Main Processing of Baseball Game>

Figure 10:
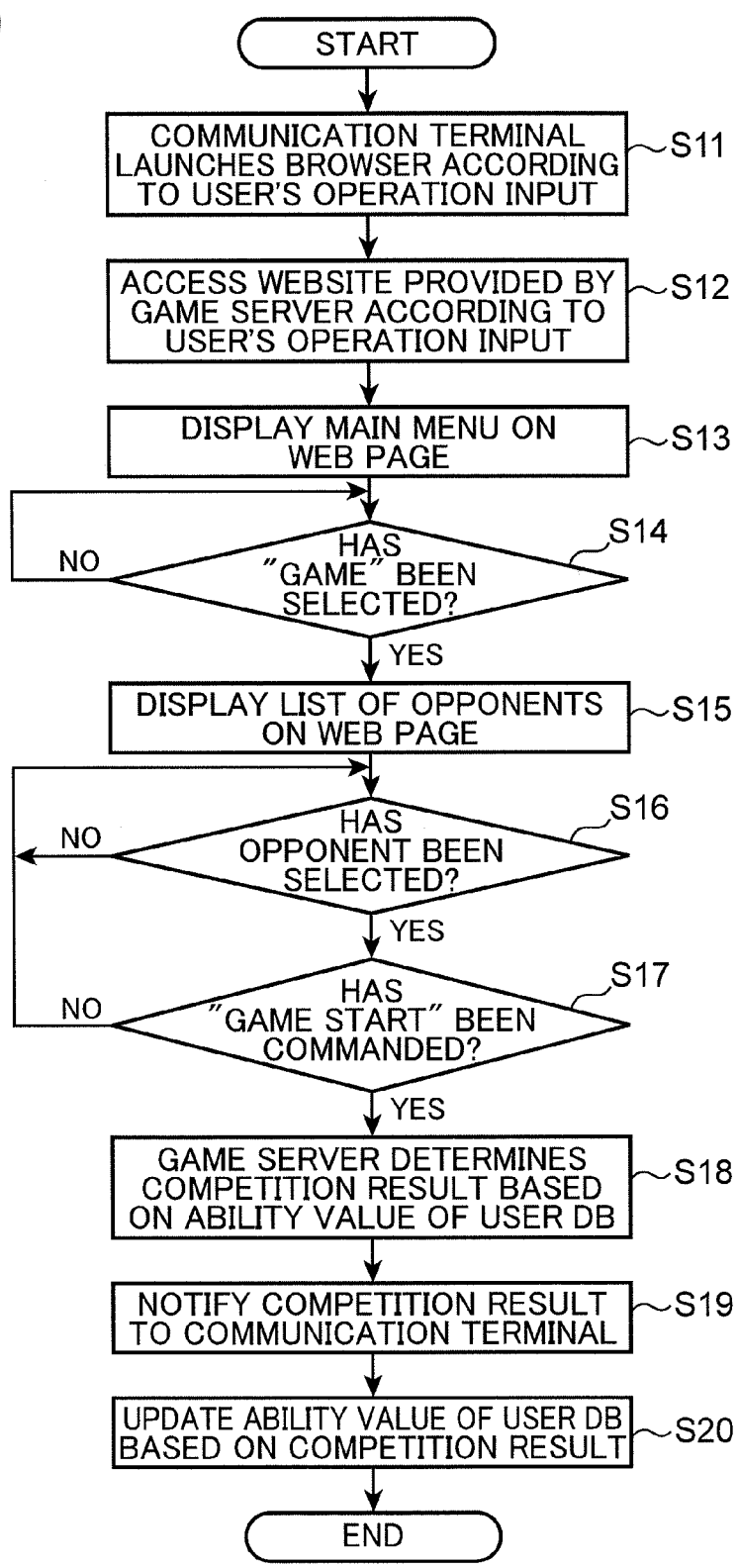
FIG. 10 is a flowchart showing a part of the main processing of the baseball game in the game system.

An example of the main processing flow of the baseball game in this embodiment is now explained. FIG. 10 is a flowchart showing a part of the main processing of the baseball game in the game system of one embodiment.

In FIG. 10, the communication terminal 10 launches the web browser upon receiving the user's predetermined operation input to the operation input unit 15 (step S11). After the web browser is launched, the communication terminal 10 receives the user's predetermined operation input to the operation input unit 15, and accesses the website of the baseball game provided by the game server 20 (step S12). Note that, here; let it be assumed that the user operating the communication terminal 10 has already acquired the user ID. From this point onward, the game server 20 manages the user's access via the communication terminal 10 based on the user ID.

When the communication terminal 10 accesses the website of the baseball game, the game advancing unit 52 is executed. The game advancing unit 52 displays, for example, the top web page as shown in FIG. 9 on the communication terminal 10 (step S13). When the "game" m4 is selected in the main menu of this web page (step S14: YES), the game advancing unit 52 displays, on the communication terminal 10, a list of opponents (for example, list of user IDs) as the web page for selecting the opponent of an individual competition (step S15).

Subsequently, when one of the opponents (user IDs) is selected based on the user's appropriate operation to the operation input unit 15 of the communication terminal 10 (step S16: YES), the game processing unit 523 of the game advancing unit 52 sends, to the communication terminal 10, HTML data for displaying a web page for confirming the opponent and urging the game start based on the user ID of the opponent selected by the user. Subsequently, when a selection operation for instructing the game start is performed on the web page displayed on the communication terminal 10 (step S17: YES), the game processing unit 523 executes an individual competition between characters corresponding to the selected user ID and the selected user ID. The game processing unit 523 determines the competition result of the individual competition based on the ability values of the character stored in the storage unit 54 (in this embodiment, the user DB 31 of the DB server 30) (step S18). The competition result of the individual competition is determined based on the ability values of the character of the opponent's user ID. For example, the game processing unit 523 compares the ability values of the character associated with the two user IDs to become the opponent, and the competition result is determined so that the character with a greater ability value wins the competition with higher probability. In the foregoing case, when there are a plurality of ability value items to be compared, a comprehensive ability value may be set with predetermined weighting (for example, weighting the "batting power" as 0.4, "running ability" as 0.2, and "fielding skill" as 0.4).

When the competition result of the individual competition is determined, the game processing unit 523 sends HTML data for displaying a web page including the competition result on the communication terminal 10 of the user of the two user IDs to become the opponent. Consequently, the competition result is displayed on; that is, notified to the communication terminal 10 through the display of the web page (step S19).

Subsequently, the game processing unit 523 updates the ability values of the character corresponding to the user ID stored in the storage unit 54 (user DB 31) based on the competition result of the individual competition (step S20). For example, when the character corresponding to the user ID wins the individual competition, the ability values are updated to be greater than the current ability values, and when the character corresponding to the user ID loses the individual competition, the ability values are updated to be smaller than the current ability values. Thus, the user will actively engage in individual competition in order to improve the ability values of the character corresponding to one's own user ID. Moreover, when viewed from the user, the execution of this individual competition can be performed with an extremely simple operation, and the competition result of the competition itself can also be notified to the user in an extremely short period of time since complicated arithmetic processing is not required in the game server 20.

<More Detailed Explanation of Enhancement Processing>

Figure 11:
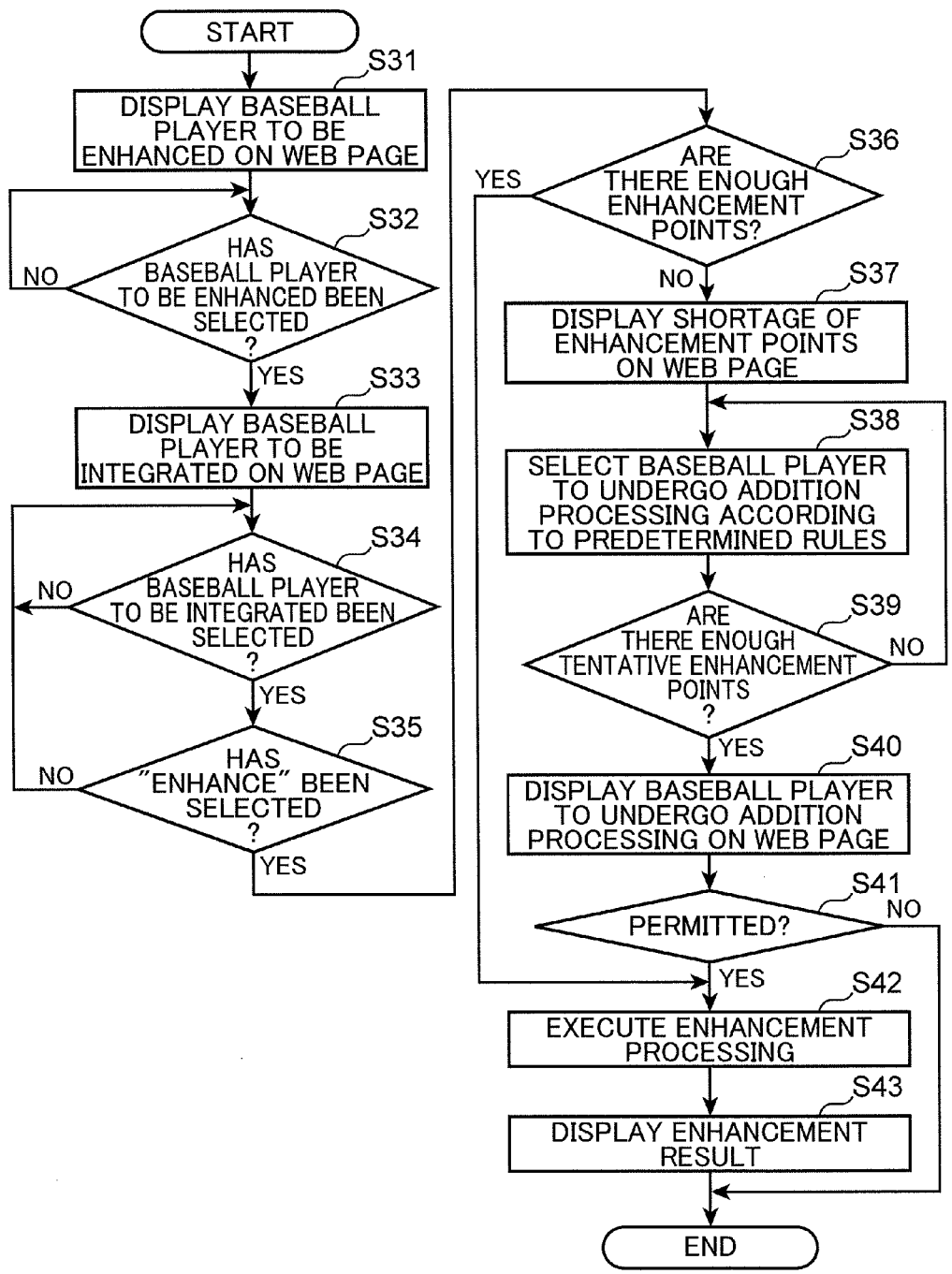
FIG. 11 is a flowchart showing the enhancement processing in the game system.
Figure 14:
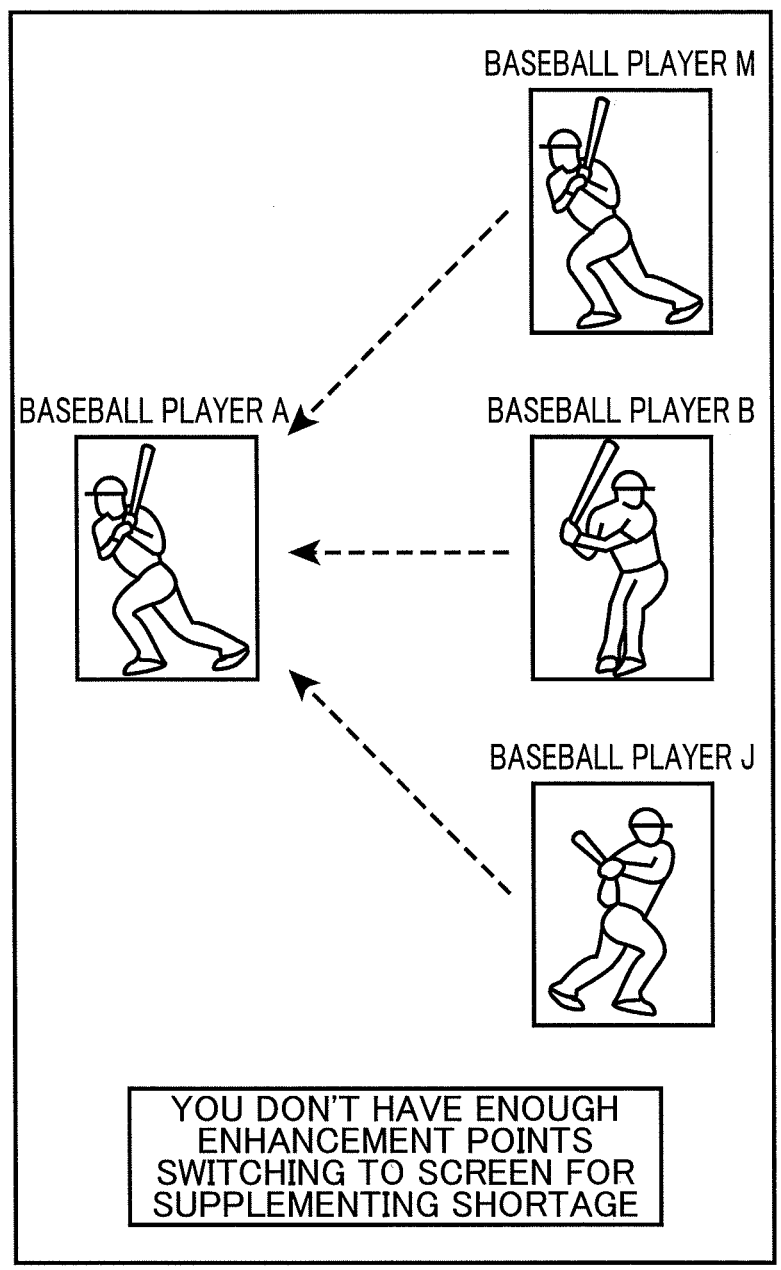
FIG. 14 shows an example of a web page for notifying the shortage of enhancement points and switching to the shortage supplying processing that are displayed on the communication terminal by the game advancing unit of the game control device.

The enhancement processing in a digital card game of this kind of baseball format is now explained in further detail. FIG. 11 is a flowchart showing the enhancement processing in the game system of one embodiment. FIG. 12 shows an example of a web page for selecting the baseball player to be enhanced that is displayed on the communication terminal by the game advancing unit of the game control device. FIG. 13 shows an example of a web page for selecting the baseball players to be integrated that are displayed on the communication terminal by the game advancing unit of the game control device. FIG. 14 shows an example of a web page for notifying the shortage of enhancement points and switching to the shortage supplying processing that are displayed on the communication terminal by the game advancing unit of the game control device. FIG. 15 shows an example of a web page for inquiring whether or not to permit the sale that is displayed on the communication terminal by the game advancing unit of the game control device. FIG. 16 shows an example of a web page for displaying the enhancement processing result that is displayed on the communication terminal by the game advancing unit of the game control device.

In FIG. 11, when, for example, the top web page as shown in FIG. 9 is displayed on the communication terminal 10 by the game advancing unit 52 and the "enhancement" m2 is selected in the main menu of this web page, in order to execute the enhancement processing for enhancing the baseball player card (character), the enhancement processing unit 522 (CPU 21 of the game server 20) foremost searches for the baseball player card held by the user of the communication terminal 10, with the user ID of the user from the total card data DB 321 as the key, as the web page for designating the baseball player card of the baseball player to be enhanced (baseball player to be enhanced), and displays, on the communication terminal 10, the web page listing the baseball player cards corresponding to this user ID based on the search result (step S31).

The web page for designating the baseball player card of the baseball player to be enhanced is a list that arranges the baseball player display areas AR (AR-11, AR-12, AR-13, . . . ), along the scroll direction, displaying the baseball player cards as shown in FIG. 12. The baseball player display area AR comprises, for example, an image area for displaying the image of the baseball player, a baseball player name area for displaying the baseball player name, an ability area for displaying the ability value of the abilities (in this embodiment, the respective abilities of batting power, running ability and fielding skill), and a checkbox for receiving the designation of the baseball player card.

Subsequently, the enhancement processing unit 522 determines whether the user has selected the baseball player card of the baseball player to be enhanced (step S32). The enhancement processing unit 522 repeats the determination of step S32 until the user selects the baseball player card of the baseball player to be enhanced (step S32: No), and, when the enhancement processing unit 522 receives the selection of the baseball player to be enhanced based on the user's scroll operation and the check operation of the checkbox (for example, operation of pushing (tapping) the checkbox using one's fingertip) (step S32: Yes), the enhancement processing unit 522 searches for the baseball player card held by the user of the communication terminal 10, with the user ID of the user from the total card data DB 321 as the key, as the web page for designating the baseball players to be integrated (baseball players to be integrated), who are integrated with the baseball player to be enhanced and then eliminated, and displays, on the communication terminal 10, the web page listing the baseball player cards corresponding to this user ID based on the search result but excluding the baseball player cards that were designated for enhancement in step S32 (step S33).

The web page for designating the baseball player card of the baseball players to be integrated comprises, as shown in FIG. 13, a list that arranges the baseball player display areas AR (AR-21, AR-22, AR-23, AR-24, AR-25, . . . ) similar to those shown in FIG. 12, along the scroll direction, displaying the baseball player cards, and an "Enhance" m11 disposed in the area at the end of the list for receiving the enhancement execution command. The baseball player display area AR comprises, for example, an image area for displaying the image of the baseball player, a baseball player name area for displaying the baseball player name, an ability area for displaying the ability value of the abilities (in this embodiment, batting power, running ability and fielding skill), and a checkbox for receiving the designation of the baseball player card.

Subsequently, the enhancement processing unit 522 determines whether the user has selected the baseball player card of the baseball players to be integrated (step S34). The enhancement processing unit 522 repeats the determination of step S34 until the user selects the baseball player card of the baseball players to be integrated (step S34: No), and, when the enhancement processing unit 522 receives the selection of the baseball players to be integrated based on the user's scroll operation and the check operation of the checkbox (for example, operation of pushing (tapping) the checkbox using one's fingertip) (step S34: Yes), the enhancement processing unit 522 determines whether the user has selected "Enhance" (step S35).

When the user has not selected the "Enhance" m11 based on the determination result of step S35 (step S35: No), the enhancement processing unit 522 returns the processing to the processing of step S34. Meanwhile, when the user has selected the "Enhance" m11 based on the determination result of step S35 (step S35: Yes), the enhancement processing unit 522 executes the subsequent processing of step S36.

FIG. 12 shows an example where the baseball player card of a baseball player A has been selected as the baseball player to be enhanced based on the respective processing of step S31 and step S32, and FIG. 13 shows an example where the three baseball player cards of a baseball player M, a baseball player B and a baseball player J as the baseball players to be integrated based on the respective processing of step S33 to step S35. In addition, the text of the "Enhance" m11 is hyperlinked and, for example, when this text is selected by the user pushing (tapping) the location of the "Enhance" m11 with one's fingertip (step S35: Yes), execution of enhance in step S36 onward is advanced.

In the processing of step S36, since a given number of points (enhancement consumption points) is required for integrating one baseball player card of a baseball player to be integrated with a baseball player card of a baseball player to be enhanced, the enhancement processing unit 522 determines whether the user of the communication terminal 10 has enough enhancement points.

This determination is made, for example, as follows. Foremost, the enhancement processing unit 522 searches for the enhancement points held by the user of the communication terminal 10 with the user ID of the user from the user data DB 311 as the key. Subsequently, the enhancement processing unit 522 obtains the total enhancement consumption points by multiplying the number of baseball player cards of the baseball players to be integrated selected in step S34 by the enhancement consumption points. Subsequently, the enhancement processing unit 522 subtracts the total enhancement consumption points of the multiplication result from the enhancement points held by the user of the communication terminal 10 of the search result, and determines whether the subtraction result is 0 or more. When the subtraction result is 0 or more based on the determination result, since the user holds the total enhancement consumption points required for executing the enhancement, the enhancement processing unit 522 determines that there are enough enhancement points in the determination of step S36 (step S36: Yes), and subsequently executes the processing of step S42. Meanwhile, when the subtraction result is not 0 or more based on the determination result (when the subtraction result is less than 0; that is, negative), since the user does not have the total enhancement consumption points required for executing the enhancement, the enhancement processing unit 522 determines that there are not enough enhancement points in the determination of step S36 (step S36: No), and subsequently executes the processing of step S37.

In the processing of step S37, as the web page for notifying the user that the user does not have enough enhancement points and the routine will move to processing for supplementing the shortage, the enhancement processing unit 522 displays on the communication terminal 10, for example, a web page including the text message of "You don't have enough enhancement points. Switching to screen for supplying shortage." as shown in FIG. 14. Subsequently, the enhancement processing unit 522 causes the enhancement point processing unit 527 of the game advancing unit 52 to start the processing described later for supplementing the shortage of the enhancement points. In response, the enhancement point processing unit 527 executes the processing of step S38 onward.

In addition to the cases of winning the competition against the other user and after the lapse of a predetermined time, the baseball-type digital card game in this embodiment is set so that, when the baseball player card is changed from being owned to disowned by the user, for instance, when the baseball player card is sold or given as a gift or ownership is simply abandoned, the given number of points for the disowned baseball player card are given to the user as the enhancement points. Moreover, in this embodiment, as an example of a mode for changing the user's ownership of the baseball player card from owned to disowned, a case of selling the baseball player card is explained.

In the foregoing case, the enhancement point processing unit 527 (CPU 21 of the game server 20) selects, in the processing of step S38, the baseball player card to be sold so that the given number of points will be given to the user as the enhancement points among the baseball player cards held by the user in accordance with predetermined rules. Subsequently, the enhancement point processing unit 527 tentatively adds, to the enhancement points corresponding to the user ID of the user, the given number of points that are given when the selected baseball player card is sold. In other words, the storage unit 54 stores the current enhancement points corresponding to the user ID of the user and the enhancement points (tentative enhancement points) from the results of tentatively adding, to the enhancement points corresponding to the user ID of the user, the given number of points that are given when the selected baseball player card is sold. Note that the points to be given when a baseball player card is sold may be increased/decreased according to the parameter values of the baseball player card, or may be a fixed value. For example, the points to be given when a baseball player card is sold may be set to be greater as the rarity is higher, or set to be greater as the ability is higher.

The predetermined rules may be, for example, rules for causing a baseball player card not belonging to the team selected by the user, among the baseball player cards corresponding to the user ID of the user, to be changed from being owned to disowned by the user; that is, rules for selecting such baseball player card as the baseball player card to be sold (selling target) in this embodiment. Since the team selected by the user is more often than not the baseball club of one's preference, it is considered that a baseball player that does not belong to that group is of lower importance in comparison to a baseball player belonging to one's own team. Thus, in order to obtain the enhancement points, under normal circumstances, it is anticipated that the user will select a baseball player card that does not belong to the team selected by the user as the baseball player card to be sold. Thus, by following the foregoing rules, the game control device 50 can select a baseball player card that coincides with the user's intent as the baseball player card to be sold, and this processing will be suitable for the user.

Moreover, for example, the predetermined rules may also be rules for selecting, among the baseball player cards corresponding to the user ID of the user, the baseball player to be sold in order from the lowest level that is set according to a predetermined evaluative standard. In order to obtain the enhancement points, under normal circumstances, it is anticipated that the user will select the baseball player cards in order from the lowest level as the baseball player card to be sold. Thus, by following the foregoing rules, the game control device 50 can select a baseball player card that coincides with the user's intent as the baseball player card to be sold.

In the case of these predetermined rules, the evaluative standard may be, for example, the scarcity (rarity) of the baseball player card, and the level may be set to be higher as the scarcity is higher. In order to obtain the enhancement points, under normal circumstances, it is anticipated that the user will select, as the baseball player card to be sold, the baseball player cards in order from the lowest scarcity (in order of easier availability). Thus, by using the scarcity as the evaluative standard, the game control device 50 can select a baseball player card that coincides with the user's intent as the baseball player card to be sold.

Moreover, for example, the evaluative standard may be, for example, the ability of the baseball player card, and the level may be set to be higher as the ability is higher. In order to obtain the enhancement points, under normal circumstances, it is anticipated that the user will select the baseball player cards in order from the lowest ability as the baseball player card to be sold. Thus, by using the ability as the evaluative standard, the game control device 50 can select a baseball player card that coincides with the user's intent as the baseball player card to be sold.

When there are a plurality of abilities, for example, the level may be obtained based on the simple average value of the respective ability values of a plurality of abilities, or obtained based on the weighted average value of the respective ability values of a plurality of abilities, or obtained based on the ability value of a specific ability that is set in advance.

When the level is the simple average value of the respective abilities, the level can be determined based on the comprehensive ability of the baseball player card, and the game control device 50 can select the baseball player card to be sold in order from the lowest comprehensive ability. Moreover, when the level is the weighted average value of the respective abilities, the level can be determined based on the weighted level of the respective abilities of the baseball player card, and the baseball player card to be sold can be selected in order from the lowest ability of preference by relatively increasing the weighting of the preferred ability. For example, when the baseball player card is a fielder, the fielding skill is given greater weight than the other abilities, and the baseball player card to be sold is selected in order from the lowest ability while giving preference to the fielding skill. Otherwise, for example, when the baseball player card is a fielder, the batting power is greater weight than the other abilities, and the baseball player card to be sold is selected in order from the lowest ability while giving preference to the batting power. Moreover, when the level is the ability value of a specific ability, the game control device 50 can determine the level based on the specific ability of the baseball player card, and select the baseball player card to be sold in order from the lowest specific ability. In particular, by enabling the user to select the specific ability via the communication terminal 10, it is possible to automatically select a character that further coincides with the user's intent as the character to be disowned.

Moreover, for example, in the case of these predetermined rules, the evaluative standard may be the cost as points that are consumed as the total points (management cost) to be given for the organization of one team upon incorporating the baseball player card into the team, and the level may be set to be higher as the cost is higher. Normally, a baseball player card with a high default ability is set with a cost of a relatively high value, but by setting an upper limit value (the total points) to the sum of the costs of the baseball player cards belonging to the team upon organizing one team, it is possible to prevent a team from being organized only with baseball player cards with high abilities, and the game balance is thereby sought. In order to obtain the enhancement points, under normal circumstances, it is anticipated that the user will select the baseball player cards in order from the lowest cost as the baseball player card to be sold. Thus, by using the cost as the evaluative standard, the game control device 50 can select a baseball player card that coincides with the user's intent as the baseball player card to be sold.

Moreover, in the case of each of the foregoing predetermined rules, the enhancement point processing unit 527 may also be configured to select the baseball player card as the sales candidate among the baseball player cards designated by the user as the baseball players to be integrated in the respective processing of step S34 and step S35. Since the baseball player card of the baseball players to be integrated was once determined by the user for use in enhancing another baseball player card, it is considered that the foregoing baseball player card is of low importance for the user. Accordingly, the game control device 50 having the foregoing configuration can select a baseball player card that coincides with the user's intent as the baseball player card to be sold.

Subsequently, after the processing of step S38, the enhancement point processing unit 527 once again determines whether the user of the communication terminal 10 has enough tentative enhancement points (step S39). This determination is made according to the same processing as step S36. When there are enough tentative enhancement points based on the determination result of step S39 (step S39: Yes), the enhancement point processing unit 527 subsequently executes the processing of step S40. Meanwhile, when there are not enough tentative enhancement points based on the determination result of step S39 (step S39: No), the enhancement point processing unit 527 returns the processing to the processing of step S38.

By performing the respective processing of step S38 and step S39, in cases where the enhancement processing of the baseball player card is performed, when the subtraction result upon subtracting the total enhancement consumption points consumed in the enhancement processing from the enhancement points corresponding to the user ID of the user is negative, the enhancement point processing unit 527 can automatically and repeatedly execute the addition of processing for tentatively adding the given number of points to the user's enhancement points until the subtraction result becomes zero or more.

Subsequently, in the processing of step S40, the enhancement point processing unit 527 displays the baseball player card of the sales candidate that was selected in the processing of step S38 on the web page of the communication terminal 10 in order to obtain the user's permission for actually selling the baseball player card of the sales candidate that was selected in the processing of step S38 (step S40).

The web page for displaying the baseball player card of the sales candidate and seeking the permission to sell the baseball player card comprises, as shown in FIG. 15, a list that arranges the baseball player display areas AR (AR-31, AR-32) similar to those shown in FIG. 12, along the scroll direction, displaying the baseball player cards, and a "Permitted" m21 for receiving instructions for permitting the sales and a "Not Permitted" m22 for receiving instructions for not permitting the sales, which are arranged side-by-side below the list. The baseball player display area AR comprises, for example, an image area for displaying the image of the baseball player, a baseball player name area for displaying the baseball player name, and an ability area for displaying the abilities (in this embodiment, batting power, running ability and fielding skill). The respective texts of "Permitted" m21 and "Not Permitted" m22 are hyperlinked, and, for example, when the user pushes (taps) the corresponding location with one's fingertip, as described later, processing corresponding to the contents of that location is executed.

Subsequently, the enhancement point processing unit 527 determines whether the user's permission was obtained. When the "Permitted" m21 of the text for receiving instructions for permitting sales is selected based on the determination result (step S41: Yes), the enhancement point processing unit 527 determines that the user has permitted the sales, and executes the processing of step S42. Meanwhile, when the "Not Permitted" m22 of the text for receiving instructions for not permitting sales is selected based on the determination result (step S41: No), the enhancement point processing unit 527 and the enhancement processing unit 522 end this processing.

In step S42, the enhancement point processing unit 527 actually sells the candidate baseball player card and causes that baseball player card to be disowned by the user, and updates the enhancement points corresponding to the user ID of the user with the tentative enhancement points. More specifically, the enhancement point processing unit 527 rewrites the total card data DB 321 so that the candidate baseball player card actually becomes disowned by the user. For example, the currently held user ID field of the total card data DB 321 corresponding to the candidate baseball player card is rewritten with a blank. Subsequently, the enhancement processing unit 522 integrates the baseball player card of the baseball player to be enhanced and the baseball player card of the baseball player to be integrated. For example, a fixed rate of the ability values in the baseball player card of the baseball player to be integrated is added to the ability value in the baseball player card of the baseball player to be enhanced. When there are a plurality of abilities as in this embodiment, for example, the fixed rate of the respective ability values of batting power, running ability, and fielding skill in the baseball player card of the baseball player to be integrated is added to the respective ability values of batting power, running ability, and fielding skill in the baseball player card of baseball player to be enhanced. Based on this integration processing, the ability values (parameter values) of the baseball player to be integrated is reflected in the ability values (parameter values) of the baseball player to be enhanced. Subsequently, the enhancement processing unit 522 rewrites the total card data DB 321 so as to delete the data of the baseball player card of the baseball player to be integrated from the data of the user ID of the user. Subsequently, the enhancement point processing unit 527 subtracts the enhancement consumption points from the enhancement points corresponding to the user ID of the user, updates the enhancement points corresponding to the user ID of the user with the subtraction result, and thereby rewrites the user data DB 311. When there are a plurality of baseball players to be integrated, the foregoing respective processing are repeated until there are no more baseball player cards of the baseball players to be integrated.

Subsequently, the enhancement processing unit 522 displays the enhancement result based on the processing of step S42 on the web page of the communication terminal 10 (step S43). For example, as shown in FIG. 16, the image of the baseball player card of the baseball player to be enhanced and the message showing the enhancement result are displayed. In the example shown in FIG. 16, this message is the increase level of the total ability value of the baseball player to be enhanced. Note that the respective ability values of batting power, running ability and fielding skill may also be displayed individually.

With the game control device 50 (game server 20 and DB server 30) of this embodiment, when the enhancement processing of the baseball player card is performed, enhancement consumption points that are consumed in the integration processing are subtracted from the enhancement points corresponding to the user ID of the user, and when the subtraction result is negative, the point addition processing for adding a given number of points to the enhancement points is automatically performed until the subtraction result becomes zero or more. Since the point addition processing is automatically performed as described above, this kind of game control device 50 does not require the reselection of other characters to be composited as with conventional technologies, and can improve the user's operability in cases of collectively integrating, with a single operation, a plurality of baseball player characters.

Moreover, with the game control device 50 of this embodiment, since points corresponding to the disowned baseball player card are added to the enhancement points of the user ID when the ownership of the baseball player card by the user is changed from owned to disowned, characters that are determined as being unnecessary by the user or characters that are determined as being unfit for the enhancement of another character can be effectively utilized, and a composition function of compositing a plurality of baseball player cards into one baseball player card can be introduced into the game.

Note that, in the foregoing embodiment, while illustrated was processing of converting the baseball player card into points and adding these points to the user's enhancement points by disowning (selling) the other baseball player cards (characters) owned by the user in order to supplement the insufficient composition points as the point addition processing, the configuration is not limited thereto, and the addition of points also includes the following modes. In other words, as one mode, performed may be processing of converting items into points and adding these points to the user's enhancement points by disowning (selling) items owned by the user, or, as another mode, performed may be processing of converting other points (for instance, action points, management points, cheering points or the like described later) owned by the user in the game into points, and adding these points to the user's enhancement points.

Moreover, in the foregoing embodiment, while the enhancement consumption points were fixed relative to the respective baseball player cards, and the total enhancement consumption points were obtained by multiplying the number of baseball player cards of the baseball players to be integrated by the enhancement consumption points, the enhancement consumption points may also be variable according to the parameter values of the baseball player card such as the ability value or rarity, and the total enhancement consumption points may also be the sum of the enhancement consumption points corresponding to the parameter values of the baseball player cards of the baseball players to be integrated with regard to the baseball player cards of the baseball players to be integrated. In the foregoing case, the enhancement consumption points of a baseball player card with a relatively high ability value are set to be greater than the enhancement consumption points of a baseball player card with a relatively low ability value, and the enhancement consumption points of a baseball player card with a relatively high rarity are set to be greater than the enhancement consumption points of a baseball player card with a relatively low rarity.

Moreover, in the foregoing embodiment, while the sales candidate baseball player card was selected in step S38 for obtaining the enhancement points and the sales candidate baseball player card was displayed on the communication terminal 10 for seeking the user's permission for actually selling the baseball player card in step S40 and step S41, the game control device 50 may also be configured so that the baseball player card is automatically sold without seeking the user's permission for actually selling the baseball player card. For example, the game control device 50 may be configured to automatically sell the baseball player card when the parameters (for example, ability and rarity) of the baseball player card selected in step S38 are less than predetermined values. In particular, the game control device 50 may be configured to automatically sell the baseball player card known as a "normal card" with low scarcity since the user normally feels almost no attachment to a normal card.

Moreover, in the foregoing embodiment, while the group was a team (baseball club) in the baseball-type digital card game that was illustrated as an example, the configuration is not limited thereto, and the group includes the following modes. In other words, for example, as one mode, when the game is a soccer game, the group may be a team (club), and, as another mode, when the game is a combat game, the group may be a troop.

Moreover, in the foregoing embodiment, while the respective units 51 to 54 of the game control device 50 were comprised in the game server 20 and the DB server 30, a part of these units 51 to 54 may also be comprised in the communication terminal 10 in substitute for the game server 20 and the DB server 30. Moreover, all of these units 51 to 54 may also be comprised in the communication terminal 10 in substitute for the game server 20 and the DB server 30. In other words, the communication terminal 10 may also be an independent game device (game machine) as the game system.

The present specification discloses technologies of various modes as described above, and the main technologies thereof are summarized below.

The game control device according to one mode is a game control device, comprising: a character information storage unit for storing character information including character parameters by associating the character information with user identifying information; a composition point storage unit for storing composition points that are consumed at the time of compositing another character with a predetermined character by associating the composition points with the user identifying information; a composition point processing unit for executing point addition processing of updating the composition point storage unit and, when a user's predetermined operation input is executed, adding predetermined additional points to the composition points corresponding to the user's user identifying information based on information related to the operation input; and a character composition unit for compositing parameter values of another character with parameter values of a predetermined character, based on information relating to the user's operation input, and causing a character having the composited parameter values to appear, wherein, when the character composite processing is performed by the character composition unit, the composition point processing unit subtracts consumption points that are consumed in the composite processing from the composition points corresponding to the user's user identifying information, and, when a subtraction result is negative, executes the predetermined point addition processing until the subtraction result becomes zero or more.

With this kind of game control device, when composite processing of characters is performed, consumption points that are consumed in the composite processing are subtracted from the composition points corresponding to the user's user identifying information, and when the subtraction result is negative (that is, when there are not enough composition points for the composite processing), predetermined point addition processing is automatically performed until the subtraction result becomes zero or more. Since the point addition processing is automatically performed as described above, this kind of game control device does not require the reselection of other characters to be composited, and can improve the user's operability in cases of collectively integrating, with a single operation, a plurality of baseball player characters. Here, the point addition processing includes the following modes. In other words, as indicated with the other modes described later, the point addition processing includes a mode of the user disowning (selling) another character owned by the user in order to convert that character into points (addition of points) in order to supplement the shortage of composition points. In the foregoing case, the game control device may also be configured so that the user disowns (sells) an item owned by the user, in addition to disowning (selling) another character. Moreover, the game control device may also be configured so that the user transfers or exchanges other points that the owner owns in the game (for instance, the action points, management points, cheering points and the like described above) to or with the composition points.

Here, the foregoing composition includes, for example, enhancement, crossbreeding, training and combination for integrating a plurality of characters. Moreover, this composition is not limited to the integration of the entire character, and also includes cases where a part of the character is integrated as a material. Furthermore, in addition to the case of compositing a character B as a material to be integrated with a target character A, erasing the material character B, leaving the target character A, and updating the composited parameter value, the game control device may also be configured so that the target character A and the material character B are composited, the target character A and the material character B are both erased, and a new character C having the composited parameter value is created. Moreover, a character is not limited to an imitation of living things such as a human being, animal, insect or plant, and a character may also be an imitation of non-living things such as a weapon, protective gear, or tool, or a fictional living thing or life form. Moreover, the game control device may also be configured so that the foregoing items of different categories are composited. For example, the game control device may be configured so that a human being's ability will improve by compositing a weapon with that human being.

Moreover, in another mode of the foregoing game control device, when a character that will change from being owned to disowned by the user is selected from among a plurality of characters corresponding to the user's user identifying information, based on information relating to the user's operation input, the composition point processing unit adds additional points corresponding to the disowned character to the composition points.

With this kind of game control device, since additional points corresponding to the disowned character are added to the composition points when the ownership of the character by the user is changed from owned to disowned, characters that are determined as being unnecessary by the user or characters that are determined as being unfit for the enhancement of another character can be effectively utilized, and a composition function of compositing a plurality of characters into one character can be introduced into the game.

Moreover, in another mode of the foregoing game control device, the game is a game that is performed by an aggregate configured from a plurality of characters, the character information is each set with information on one group from among a plurality of groups set in advance, and the aggregate is associated with one of the groups selected by the user, and the composition point processing unit selects a character that does not belong to the group selected by the user from among characters corresponding to the user's user identifying information as being a character that will change from being owned to disowned by the user.

As the character that is selected by the user in which the ownership by the owner is changed from owned to disowned in order to obtain additional points, under normal circumstances, it is anticipated that such character will be selected among characters that do not belong to a group that has been selected by the user. Since this kind of game control device selects a character that does not belong to the group selected by the user as the character that is selected by the user in which the ownership by the owner is changed from owned to disowned, it is possible to select a character that coincides with the user's intent as the character to be disowned. Here, the foregoing group is, for example, a baseball club in the case of a baseball game, and a team in the case of a soccer game, but since the group selected by the user is more often than not the baseball club or team of one's preference, it is considered that a character (baseball player) that does not belong to that group is of lower importance in comparison to a character (baseball player) belonging to one's own group. Thus, to disown these characters (baseball players) will be processing that is suitable for the user.

Moreover, in another mode of the foregoing game control device, the composition point processing unit selects the character that will change from being owned to disowned by the user from among characters that are designated by the user as a composition subject.

A character that is once selected as a character to be used in the composition is considered to be of low importance for the user. Accordingly, since this kind of the game control device selects a character that is designated by the user for use in the composition as the character that will change from being owned to disowned by the user, it is possible to select a character that coincides with the user's intent as the character to be disowned.

Moreover, in another mode of the foregoing game control device, the predetermined point addition processing is processing of causing a character corresponding to the user's user identifying information to be a character to be changed from being owned to disowned by the user, the parameters include levels that are set according to a predetermined evaluative standard, and the composition point processing unit selects characters to be changed from being owned to disowned by the user, in order from the lowest level among characters corresponding to the user's user identifying information.

As the character that is selected by the user in which the ownership by the owner is changed from owned to disowned in order to obtain additional points, under normal circumstances, it is anticipated that such characters will be selected in order from the lowest level. Since this kind of game control device selects characters in order from the lowest level as the character that is selected by the user in which the ownership by the owner is changed from owned to disowned, it is possible to select a character that coincides with the user's intent as the character to be disowned.

Moreover, in another mode of the foregoing game control device, the evaluative standard is scarcity of a character, and the level is higher as the scarcity is higher.

As the character that is selected by the user in which the ownership by the owner is changed from owned to disowned in order to obtain additional points, under normal circumstances, it is anticipated that such characters will be selected in order from the lowest scarcity (most common). Since this kind of game control device selects characters in order from the lowest scarcity as the character that is selected by the user in which the ownership by the owner is changed from owned to disowned, it is possible to select a character that coincides with the user's intent as the character to be disowned.

Moreover, in another mode of the foregoing game control device, the evaluative standard is an ability of a character, and the level is higher as the ability is higher.

As the character that is selected by the user in which the ownership by the owner is changed from owned to disowned in order to obtain additional points, under normal circumstances, it is anticipated that such characters will be selected in order from the lowest ability. Since this kind of game control device selects characters in order from the lowest ability as the character that is selected by the user in which the ownership by the owner is changed from owned to disowned, it is possible to select a character that coincides with the user's intent as the character to be disowned.

Moreover, in another mode of the foregoing game control device, the character has a plurality of abilities, and the level is obtained from a simple average value or a weighted average value of the respective ability values of the plurality of abilities, or from an ability value of a specific ability.

When the level is the simple average value of the respective abilities, this kind of game control device can determine the level based on the character's comprehensive ability, and select the characters to be disowned in order from the lowest comprehensive ability. Moreover, when the level is the weighted average value of the respective abilities, this kind of game control device can determine the weighted level of the respective abilities of the character, and select the characters to be disowned in order from the lowest ability to be given preference. For example, in a baseball game where the character is a fielder, the fielding skill is given greater weight than the other abilities, and the characters to be disowned are selected in order from the lowest ability while giving preference to the fielding skill. Moreover, when the level is the ability value of a specific ability, this kind of game control device can determine the level based on the specific ability of the character, and select the characters to be disowned in order from the lowest specific ability. In particular, by enabling the user to select the specific ability, it is possible to automatically select a character that further coincides with the user's intent as the character to be disowned.

Moreover, in another mode of the foregoing game control device, when the user selects a character to be changed from being owned to disowned by the user, the composition point processing unit displays the selected character information on the user's game device, and automatically executes the predetermined point addition processing after receiving the user's permission.

With this kind of game control device, the point addition processing is automatically executed after the selected character information is displayed on the user's game device, and the user's permission is received. Accordingly, this kind of game control device can prevent the user's unexpected character from becoming disowned without the user's knowledge by confirming the user's intent.

A game control method according to another mode is a game control method, comprising: a character information storage step of storing, in a character information storage unit, character information including character parameters by associating the character information with user identifying information; a composition point storage step of storing, in a composition point storage unit, composition points that are consumed at the time of compositing another character with a predetermined character by associating the composition points with the user identifying information; a composition point processing step of executing point addition processing of updating the composition point storage unit and, when a user's predetermined operation input is executed, adding predetermined additional points to the composition points corresponding to the user's user identifying information, based on information related to the operation input; and a character composition step of compositing parameter values of another character with parameter values of a predetermined character, based on information relating to the user's operation input, and causing a character having the composited parameter values to appear, wherein when the character composite processing is performed in the character composition step, the composition point processing step subtracts consumption points that are consumed in the composite processing from the composition points corresponding to the user's user identifying information, and, when a subtraction result is negative, executes the predetermined point addition processing until the subtraction result becomes zero or more.

Moreover, a game control program according to another mode is a game control program for a computer capable of realizing a game, the computer comprising: a character information storage unit for storing character information including character parameters by associating the character information with user identifying information; a composition point storage unit for storing composition points that are consumed at the time of compositing another character with a predetermined character by associating the composition points with the user identifying information; a composition point processing unit for executing point addition processing of updating the composition point storage unit and, when a user's predetermined operation input is executed, adding predetermined additional points to the composition points corresponding to the user's user identifying information, based on information related to the operation input; and a character composition unit for compositing parameter values of another character with parameter values of a predetermined character based on information relating to the user's operation input, and causing a character having the composited parameter values to appear, wherein when the character composite processing is performed by the character composition unit, the composition point processing unit subtracts consumption points that are consumed in the composite processing from the composition points corresponding to the user's user identifying information, and, when a subtraction result is negative, executes the predetermined point addition processing until the subtraction result becomes zero or more.

Moreover, in a storage medium of a game control program according to another mode, a computer-readable storage medium with a game control program recorded thereon, the game control program being provided for a computer capable of realizing a game, the computer comprising: a character information storage unit for storing character information including character parameters by associating the character information with user identifying information; a composition point storage unit for storing composition points that are consumed at the time of compositing another character with a predetermined character by associating the composition points with the user identifying information; a composition point processing unit for executing point addition processing of updating the composition point storage unit and, when a user's predetermined operation input is executed, adding predetermined additional points to the composition points corresponding to the user's user identifying information, based on information related to the operation input; and a character composition unit for compositing parameter values of another character with parameter values of a predetermined character, based on information relating to the user's operation input, and causing a character having the composited parameter values to appear, wherein when the character composite processing is performed by the character composition unit, the composition point processing unit subtracts consumption points that are consumed in the composite processing from the composition points corresponding to the user's user identifying information, and, when a subtraction result is negative, executes the predetermined point addition processing until the subtraction result becomes zero or more.

Moreover, a game system according to another mode is a game system having a communication terminal that is connected accessibly, and a game control device for controlling an execution of a game by the communication terminal, the game system comprising in either the communication terminal or the game control device: a character information storage unit for storing character information including character parameters by associating the character information with user identifying information; a composition point storage unit for storing composition points that are consumed at the time of compositing another character with a predetermined character by associating the composition points with the user identifying information; a composition point processing unit for executing point addition processing of updating the composition point storage unit and, when a user's predetermined operation input to the communication terminal is executed, adding predetermined additional points to the composition points corresponding to the user's user identifying information, based on information related to the operation input; and a character composition unit for compositing parameter values of another character with parameter values of a predetermined character, based on information relating to the user's operation input to the communication terminal, and causing a character having the composited parameter values to appear, wherein when the character composite processing is performed by the character composition unit, the composition point processing unit subtracts consumption points that are consumed in the composite processing from the composition points corresponding to the user's user identifying information, and, when a subtraction result is negative, executes the predetermined point addition processing until the subtraction result becomes zero or more.

With this kind of game control method, game control program, storage medium and game system, when composite processing of characters is performed, consumption points that are consumed in the composite processing are subtracted from the composition points corresponding to the user's user identifying information, and when the subtraction result is negative, predetermined point addition processing is automatically performed until the subtraction result becomes zero or more. Since the point addition processing is automatically performed as described above, the game control device, game control method, game control program, storage medium and game system of the present invention can improve the user's operability without requiring the reselection of other characters to be composited.

This application relates to and claims priority from Japanese Patent Application No. 2012-100644, filed on Apr. 26, 2012, the entire disclosure of which is incorporated herein by reference.

While the present invention has been appropriately and sufficiently explained above based on the embodiments with reference to the drawings in order to express the present invention, it should be recognized that a person skilled in the art could easily modify and/or improve the foregoing embodiments. Accordingly, so as long as the mode of modification or mode of improvement implemented by a person skilled in the art is of a level that does not deviate from the scope of claims provided below, it shall be interpreted that such mode of modification or mode of improvement is covered by the scope of claims of the present specification.

INDUSTRIAL APPLICABILITY

According to the present invention, it is possible to provide a game control device, a game control method, a storage medium and a game system.

The invention claimed is:

1. A game control device for controlling operation of a game on a user's game device, comprising:
   a hardware processor; and
   a non-transitory memory storing a program, the program being executed by the hardware processor and causing the game control device to operates as:
   a character information storage unit configured to store user identifying information and character information including character parameters associated with a plurality of characters, and configured to associate the character information with user identifying information;
   a composition point storage unit for storing composition points that are consumed at the time of compositing a predetermined character with another character by associating the composition points with the user identifying information, the predetermined character and the another character being among the plurality of characters having character information stored in the character information storage unit;
   a composition point processing unit configured to execute point addition processing of adding predetermined additional points to the composition points stored in the composition point storage unit corresponding to the user's user identifying information when a user's predetermined operation input is executed; and
   a character composition unit configured to execute character composite processing by compositing parameter values of the another character with parameter values of the predetermined character, based on information relating to the user's operation input and the composition points stored in the composition point storage unit corresponding to the user's user identifying information, and generating a composite character having the composited parameter values,
   wherein, when the character composite processing is performed by the character composition unit, the composition point processing unit subtracts consumption points that are consumed in the character composite processing from the composition points stored in the composition point storage unit corresponding to the user's user identifying information, and, when a subtraction result is a negative composition point value, executes automatically a predetermined point addition processing based on predetermined rules until the subtraction result is a positive composition point value for the composition points stored in the composition point storage unit corresponding to the user's user identifying information, and wherein the character composite processing is performed only when the composition point value for the composition points stored in the composition point storage unit corresponding to the user's user identifying information remains positive.

2. The game control device according to claim 1, wherein, when a character that will change from being owned and included with the character information associated with the user's user identifying information to disowned and not included with the character information associated with the user's user identifying information is selected from among a plurality of characters stored in the character information storage unit and corresponding to the user's user identifying information, based on information relating to a user's operation input, the composition point processing unit adds additional points corresponding to the disowned character to the composition points.

3. The game control device according to claim 2, wherein the composition point processing unit selects the character that will change from being owned to disowned by the user from among the plurality of characters stored in the character information storage unit, which are also characters that are designated by the user as composition subjects used for character composite processing.

4. The game control device according to claim 2, wherein, when the user selects the character to be changed from being owned to disowned by the user, the composition point processing unit causes the display of the selected character information on the user's game device, and executes the predetermined point addition processing after receiving the user's permission.

5. The game control device according to claim 1, wherein the game is a game that is performed by the composite character configured from a plurality of characters, the character information includes information on one group from among a plurality of groups set in advance, and the composite character is associated with one of the groups selected by the user, and the composition point processing unit selects a character that does not belong to the group selected by the user from among characters corresponding to the user's user identifying information as a character that will change from being owned and included with the character information associated with the user's user identifying information to disowned and not included with the character information associated with the user's user identifying information.

6. The game control device according to claim 1, wherein the predetermined point addition processing is processing that is a result of causing a character corresponding to the user's user identifying information to be a character to be changed from being owned and included with the character information associated with the user's user identifying information to disowned and not included with the character information associated with the user's user identifying information, the character parameters include levels that are set according to a predetermined evaluative standard, and the composition point processing unit selects characters to be changed from being owned and included with the character information associated with the user's user identifying information to disowned and not included with the character information associated with the user's user identifying information, in an order starting from a lowest level among the plurality of characters stored in character information storage unit and corresponding to the user's user identifying information.

7. The game control device according to claim 6, wherein the evaluative standard is scarcity of a character, and the level is higher as the scarcity is higher.

8. The game control device according to claim 6, wherein the evaluative standard is an ability of a character, and the level is higher as the ability is higher.

9. The game control device according to claim 8, wherein the character has a plurality of abilities, and the level is obtained from a simple average value or a weighted average value of the respective ability values of the plurality of abilities, or from an ability value of a specific ability.

10. A game control method for a game control device implemented for controlling operation of a game on a user's game device, the game control device including a hardware processor and a non-transitory memory storing a program, the program being executed by the hardware processor and causing the game control device to perform the game control method comprising:

storing, in a character information storage unit, user identifying information and character information including character parameters associated with a plurality of characters and associating the character information with user identifying information;

storing, in a composition point storage unit, composition points that are consumed at the time of compositing a predetermined character and another character by associating the composition points with the user identifying information, the predetermined character and the another character being among the plurality of characters having character information stored in the character information storage unit;

executing point addition processing of adding predetermined additional points to the composition points stored in the composition point storage unit corresponding to the user's user identifying information when a user's predetermined operation input is executed; and compositing parameter values of the another character with parameter values of the predetermined character, based on information relating to the user's operation input and the composition points stored in the composition point storage unit corresponding to the user's user identifying information, and generating a composite character having the composited parameter values, wherein when the character composite processing is performed, the composition point processing subtracts consumption points that are consumed in the character composite processing from the composition points stored in the composition point storage unit corresponding to the user's user identifying information, and, when a subtraction result is a negative composition point value, executes automatically a predetermined point addition processing based on predetermined rules until the subtraction result is a positive composition point value for the composition points stored in the composition point storage unit corresponding to the user's user identifying information, and wherein the character composite processing is performed only when the composition point value of the composition points stored in the composition point storage unit corresponding to the user's user identifying information remains positive.

11. A non-transitory computer-readable storage medium with a game control program recorded thereon, the game control program being for executed by a computer and causing a computer to operate as:
  a character information storage unit configured to store user identifying information and character information including character parameters associated with a plurality of characters, and configured to associate the character information with user identifying information;
  a composition point storage unit for storing composition points that are consumed at the time of compositing a predetermined character with another character by associating the composition points with the user identifying information, the predetermined character and the another character being among the plurality of characters having character information stored in the character information storage unit;
  a composition point processing unit configured to execute point addition processing of adding predetermined additional points to the composition points stored in the composition point storage unit corresponding to the user's user identifying information when a user's predetermined operation input is executed; and
  a character composition unit configured to execute character composite processing by compositing parameter values of the another character with parameter values of the predetermined character, based on information relating to the user's operation input and the composition points stored in the composition point storage unit corresponding to the user's user identifying information, and generating a composite character having the composited parameter values,
  wherein, when the character composite processing is performed by the character composition unit, the composition point processing unit subtracts consumption points that are consumed in the character composite processing from the composition points stored in the composition point storage unit corresponding to the user's user identifying information, and, when a subtraction result is a negative composition point value, executes automatically a predetermined point addition processing based on predetermined rules until the subtraction result is a positive composition point value for the composition points stored in the composition point storage unit corresponding to the user's user identifying information, and
  wherein the character composite processing is performed only when the composition point value for the composition points stored in the composition point storage unit corresponding to the user's user identifying information remains positive.

12. A game system having a communication terminal that is connected accessibly, and a game control device for controlling an execution of a game by the communication terminal, the game system being included in either the communication terminal or the game control device and comprising:
  a hardware processor; and
  a non-transitory memory storing a program, the program being executed by the hardware processor and causing the communication terminal or the game control device to operates as:
  a character information storage unit configured to store user identifying information and character information including character parameters associated with a plurality of characters, and configured to associate the character information with user identifying information;
  a composition point storage unit for storing composition points that are consumed at the time of compositing a predetermined character with a another character by associating the composition points with the user identifying information, the predetermined character and the another character being among the plurality of characters having character information stored in the character information storage unit;
  a composition point processing unit configured to execute point addition processing of adding predetermined additional points to the composition points stored in the composition point storage unit corresponding to the user's user identifying information when a user's predetermined operation input is executed; and
  a character composition unit configured to execute character composite processing by compositing parameter values of the another character with parameter values of the predetermined character, based on information relating to the user's operation input and the composition points stored in the composition point storage unit corresponding to the user's user identifying information, and generating a composite character having the composited parameter values,
  wherein, when the character composite processing is performed by the character composition unit, the composition point processing unit subtracts consumption points that are consumed in the character composite processing from the composition points stored in the composition point storage unit corresponding to the user's user identifying information, and, when a subtraction result is a negative composition point value, executes automatically a predetermined point addition processing based on predetermined rules until the subtraction result is a positive composition point value for the composition points stored in the composition point storage unit corresponding to the user's user identifying information, and
  wherein the character composite processing is performed only when the composition point value for the composition points stored in the composition point storage unit corresponding to the user's user identifying information remains positive.

* * * * *